US012776586B2

(12) United States Patent
Ndukaife et al.

(10) Patent No.: US 12,776,586 B2
(45) Date of Patent: Oct. 27, 2026

(54) SYSTEM AND METHOD OF NANOSCALE OPTICAL TRAPPING AND ANALYSIS USING ENGINEERED DIELECTRIC OPTICAL NANO-ANTENNA

(71) Applicant: Vanderbilt University, Nashville, TN (US)

(72) Inventors: Justus C. Ndukaife, Nashville, TN (US); Ikjun Hong, Nashville, TN (US); Chuchuan Hong, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 3 days.

(21) Appl. No.: 18/989,285

(22) Filed: Dec. 20, 2024

(65) Prior Publication Data

US 2025/0210881 A1 Jun. 26, 2025

Related U.S. Application Data

(60) Provisional application No. 63/614,233, filed on Dec. 22, 2023.

(51) Int. Cl.

| | |
|---|---|
| ***H01Q 19/10*** | (2006.01) |
| ***H01Q 1/42*** | (2006.01) |
| ***H01Q 15/14*** | (2006.01) |

(52) U.S. Cl.

CPC ............ *H01Q 19/10* (2013.01); *H01Q 1/422* (2013.01); *H01Q 15/14* (2013.01)

(58) Field of Classification Search

CPC .. H01Q 1/38; H01Q 1/42; H01Q 1/48; H01Q 15/00; H01Q 15/14; H01Q 19/10; G02B 1/002; G02B 21/32

See application file for complete search history.

(56) References Cited

U.S. PATENT DOCUMENTS

| | | | | |
|---|---|---|---|---|
| 9,443,632 | B2 | 9/2016 | Wereley et al. | |
| 9,952,557 | B2 * | 4/2018 | Shaltout | G02F 1/00 |
| 10,180,383 | B2 | 1/2019 | Ndukaife et al. | |
| 10,508,981 | B2 | 12/2019 | Ndukaife et al. | |
| 10,656,311 | B2 | 5/2020 | Ndukaife | |
| 10,876,946 | B2 | 12/2020 | Ndukaife et al. | |
| 10,969,522 | B2 | 4/2021 | Ndukaife | |
| 11,233,332 | B2 * | 1/2022 | Hong | G02B 6/12 |
| 11,367,539 | B2 | 6/2022 | Zheng et al. | |
| 11,823,807 | B2 | 11/2023 | Ndukaife | |
| 12,176,121 | B2 | 12/2024 | Ndukaife | |

(Continued)

OTHER PUBLICATIONS

Ali et al., "Extracellular vesicles for treatment of solid organ ischemia-reperfusion injury," American Journal of Transplantation, 2020, 20(12): 3294-3307.

(Continued)

*Primary Examiner* — Hasan Islam

(74) *Attorney, Agent, or Firm* — MICHAEL BEST & FRIEDRICH LLP

(57) ABSTRACT

A nanotweezer including an anapole nanoantenna having a double nanohole formed through a central region of the anapole nanoantenna, a spacer layer positioned between the anapole nanoantenna and a reflector layer, and a light source configured to illuminate the reflector layer. Upon illumination of the reflector layer by the light source, an optical gradient force is generated at the double nanohole.

20 Claims, 16 Drawing Sheets

(56) References Cited

U.S. PATENT DOCUMENTS

| | | | |
|---|---|---|---|
| 2011/0033887 | A1 | 2/2011 | Fang et al. |
| 2012/0292496 | A1 | 11/2012 | Escobedo et al. |
| 2014/0204372 | A1 | 7/2014 | Pang et al. |
| 2017/0284935 | A1 | 10/2017 | Ndukaife et al. |
| 2019/0154558 | A1 | 5/2019 | Ndukaife et al. |
| 2024/0075475 | A1 | 3/2024 | Ndukaife et al. |

OTHER PUBLICATIONS

Allan et al., "Soft-Matter/Trackpy: Trackpy v0. 5.0," Genève: Zenodo, 2021, found in webpage <https://zenodo.org/records/4682814>.
Aouani et al., "Third-harmonic-upconversion enhancement from a single semiconductor nanoparticle coupled to a plasmonic antenna," Nature Nanotechnology, 2014, vol. 9, pp. 290-294.
Ashkin et al., "Observation of a single-beam gradient force optical trap for dielectric particles", Optics Letters, vol. 11, No. 5, 1986, 3 pages.
Ashkin et al., "Optical Trapping and Manipulation of Single Cells Using Infrared Laser Beams," Letters to Nature, 1987, vol. 330 24/31 pp. 769-771.
Ashkin et al., "Optical trapping and manipulation of viruses and bacteria", Science, vol. 235, 1987, pp. 1517-1520.
Ashkin, "Optical trapping and manipulation of neutral particles using lasers," Proceedings of the National Academy of Sciences, 1997, 94: 4853-4860.
Baffou et al., "Mapping Heat Origin in Plasmonic Structures", Physical Review Letters, vol. 104, 2010, pp. 136805-1-136805-4.
Baffou et al., "Photoinduced heating of nanoparticle arrays," ACS Nano, 2013, vol. 7, No. 8, p. 6478-6488.
Baryshnikova et al., "Optical Anapoles: Concepts and Applications," Adv. Opt Mater, 2019, 7(14): 1801350.
Belkin et al., "Plasmonic Nanopores for Trapping, Controlling Displacement, and Sequencing of DNA," ACS Nano, 2015, vol. 9 No. 11, pp. 10598-10611.
Benson, "Assembly of hybrid photonic architectures from nanophotonic constituents," Nature, 2011, vol. 480, 193-199.
Berthelot et al., "Three-dimensional manipulation with scanning near-field optical nanotweezers", Nature Nanotechnology, 2014, vol. 9, pp. 295-299.
Blázquez-Castro, "Optical tweezers: Phototoxicity and thermal stress in cells and biomolecules," Micromachines, vol. 10, 2019, pp. 1-42.
Bordanaba-Florit et al., "Using single-vesicle technologies to unravel the heterogeneity of extracellular vesicles," Nature Protocols, 2021, 16:7 3163-3185.
Chou et al., "Plasmonic nanostructures for light trapping in organize photovoltaic devices," Royal Society of Chemistry, Nanoscale, 2016, 6: 8444-8458.
Conteduca et al., "Exploring the Limit of Multiplexed Near-Field Optical Trapping," ACS Photonics, 2021, 8(7): 2060-2066.
Crozier et al., "Quo vadis, Plasmonic Optical Tweezers?," Light: Sci. Appl, 2019, 8(1): 35.
Donner et al., "Plasmon-assisted optofluidics," ACS Nano, 2011, 5: 5457-5462.
Garcia-Guirado et al., "Overcoming Diffusion-Limited Biosensing by Electrothermoplasmonics," ACS Photonics, vol. 5, No. 9, 2018, pp. 3673-3679.
Gardiner et al., "Measurement of Refractive Index by Nanoparticle Tracking Analysis Reveals Heterogeneity in Extracellular Vesicles," J. Extracell. Vesicles, 2014, 3(1): 25361.
Gargiulo et al., "Understanding and Reducing Photothermal Forces for the Fabrication of Au Nanoparticle Dimers by Optical Printing," Nano Lett, 2017, 17(9): 5747-5755.
Ghosh et al., "All optical dynamic nanomanipulation with active colloidal tweezers," Nat. Commun., vol. 10, No. 1, 2019, pp. 4191.
Grigorenko et al., "Nanometric optical tweezers based on nanostructured substrates," Nature Photon., 2008, vol. 2, p. 365-370.
Gurvitz et al., "The High-Order Toroidal Moments and Anapole States in All-Dielectric Photonics," Laser Photon Rev, 2019, 13(5): 1800266.
Hansen et al., "Nano-optical conveyor belt, part I: theory," Nano Letters, 2014, 14: 2965-2970.
Hatlo et al., "The role of image charges in the interactions between colloidal particles," Soft Matter, vol. 4, No. 8, 2008, pp. 1582-1596.
Hernández-Sarria et al., "Toward Lossless Infrared Optical Trapping of Small Nanoparticles Using Nonradiative Anapole Modes," Phys. Rev. Lett, 2021, 127(18): 186803.
Hong et al., "Electrothermoplasmonic Trapping and Dynamic Manipulation of Single Colloidal Nanodiamond," Nano Lett, 2021, 21(12): 4921-4927.
Hong et al., "Optofluidic control using plasmonic TiN bowtie nanoantenna," Opt. Mater. Express, vol. 9, No. 3, 2019, 12 pages.
Hong et al., "Stand-off trapping and manipulation of sub-10 nm objects and biomolecules using opto-thermo-electrohydrodynamic tweezers," Nature Nanotechnology, 2020, 15: 908-913.
Hong et al., "These 'tweezers' made of light gently grasp and move a single protein," Nature, 2020, 585: 163.
Huidobro et al., "Plasmonic Brownian ratchet," American Physical Society Review B, 2013, 88: 201401.
Jackson, Classical Electrodynamics, 3rd ed.; Wiley: New York, 1999; p. 261.
Jazayeri et al., "All-Dielectric Structure for Trapping Nanoparticles via Light Funneling and Nanofocusing," JOSA B, 2017, 34(10): 2179-2184.
Jeppesen et al., "Extracellular Vesicles and Nanoparticles: Emerging Complexities," Trends Cell Biol, 2023, 33: 667-681.
Jiang et al., "All-Dielectric Nanoantenna for Low Power Optical Trapping of Nanoscale Objects with Ultra-Low Heat Generation," 2021 Conference on Lasers and Electro-Optics, CLEO 2021—Proceedings, Optica Publishing Group, 2021, 2 pages.
Jiang et al., "Quantifying the Role of the Surfactant and the Thermophoretic Force in Plasmonic Nano-Optical Trapping," Nano Lett, 2020, 20(12): 8811-8817.
Juan et al., "Plasmon nano-optical tweezers," Nature Photonics, 2011, vol. 5, 349-356.
Juan et al., "Self-induced back-action optical trapping of dielectric nanoparticles," Nat. Phys., vol. 5, No. 12, 2009, pp. 915-919.
Kalluri et al., "The biology, function, and biomedical applications of exosomes," Science, 2020, 367(6478): eaau6977.
Kang et al., "Low-power nano-optical vortex trapping via plasmonic diabolo nanoantennas," Nature Communications, 2011, 2: 582.
Krishnan et al., "Geometry-induced electrostatic trapping of nanometric objects in a fluid," Nature, vol. 467, No. 7, 2010, pp. 692-695.
Kruglik et al., "Raman Tweezers Microspectroscopy of circa 100 Nm Extracellular Vesicles," Nanoscale, 2019, 11(4): 1661-1679.
Kumar et al., "3D3C velocimetry measurements of an electrothermal microvortex using wavefront deformation PTV and a single camera," Microfluid Nanofluid, 2011, 10: 355-365.
Li et al., "Optical Anapole Mode in Nanostructured Lithium Niobate for Enhancing Second Harmonic Generation," Nanophotonics, 2020, 9(11): 3575-3585.
Lide, D. R. (ed.) in CRC Handbook of Chemistry and Physics, 84th edn, 2003-2004, section 6-13, 990. (CRC Press, 2003).
Lin et al., "Opto-thermoelectric nanotweezers," Nat. Photonics, vol. 12, No. 4, 2018, pp. 195-201.
Liu et al., "Nanoantenna-enhanced gas sensing in a single tailored nanofocus," Nature Materials, 2011, vol. 10, pp. 631-636.
Makarova et al., "Extracellular MiRNAs and Cell-Cell Communication: Problems and Prospects," Trends Biochem. Sci, 2021, 46(8): 640-651.
Mandal et al., "Nanomanipulation using silicon photonic crystal resonators," Nano Lett., vol. 10, No. 1, 2010, pp. 99-104.
Margolis et al., "The biology of extracellular vesicles: The known unknowns," PLoS Biology, 2019, 17(7): e3000363.
Melcher et al., "Traveling-wave bulk electroconvection induced across a temperature gradient," Phys. Fluids, vol. 10, No. 6, 1967, pp. 1178-1185.
Melcher, "Electric fields and moving media," IEEE Transactions on Education, 1974, vol. 17, No. 2, p. 100-110.

(56) References Cited

OTHER PUBLICATIONS

Miroshnichenko et al., "Nonradiating Anapole Modes in Dielectric Nanoparticles," Nat. Commun, 2015, 6(1): 8069.
Nagpal et al., "Ultrasmooth patterned metals for plasmonics and metamaterials," Science., vol. 325, No. 5940, 2009, pp. 594-597.
Ndukaife et al., "High-Resolution Large-Ensemble Nanoparticle Trapping with Multifunctional Thermoplasmonic Nanohole Metasurface," ACS Nano, vol. 12, No. 6, 2018, pp. 5376-5384.
Ndukaife et al., "Long-range and rapid transport of individual nano-objects by a hybrid electrothermoplasmonic nanotweezer," Nat. Nanotechnol., vol. 11, No. 1, 2016, pp. 53-59.
Ndukaife et al., "Photothermal heating enabled by plasmonic nanostructures for electrokinetic manipulation and sorting of particles," ACS Nano, 2014, vol. 8 No. 9, p. 9035-9043.
Ndukaife et al., "Plasmonics—turning loss into gain," Science, 2016, vol. 351, Issue 6271, pp. 334-335.
Neuman et al., "Optical trapping", Rev. Sci. Instrum., vol. 75, No. 9, 2004, pp. 2787-2809.
Pang et al., "Optical Trapping of 12 nm Dielectric Spheres Using Double-Nanoholes in a Gold Film," Nano Lett., 2011, 11(9): 3763-3767.
Pang et al., "Optical trapping of a single protein," Nano Lett., vol. 12, No. 1, 2012, pp. 402-406.
Parthasarathy et al., "Electrorheology: mechanisms and models," Materials Science and Engineering R Reports, 1996, 17: 57-103.
Pegtel et al., "Exosomes," Annual Review of Biochemistry, 2019, 88: 487-514.
Penders et al., "Single Particle Automated Raman Trapping Analysis of Breast Cancer Cell-Derived Extracellular Vesicles as Cancer Biomarkers," ACS Nano, 2021, 15(11): 18192-18205.
Ploschner et al., "Optical forces near a nanoantenna," Journal of Nanophotonics, 2010, vol. 4, 041570.
Querry et al., "Optical Constants of Water in the 200-Nm to 200-Mm Wavelength Region," Appl. Opt, 1973, 12(3): 555-563.
Quidant et al., "Surface-plasmon-based optical manipulation," Laser & Photon. Rev. 2, 2008, p. 47-57.
Quidant, "Plasmonic tweezers—the strength of surface plasmons," Materials Research Society Bulletin, 2012, vol. 37, p. 739-744.
Ramos et al., "Ac electrokinetics: a review of forces in microelectrode structures," Journal of Physics D: Applied Physics, 1998, vol. 31, pp. 2338-2353.
Roxworthy et al., "Application of Plasmonic Bowtie Nanoantenna Arrays for Optical Trapping, Stacking, and Sorting," Nano Lett., vol. 12, No. 2, 2012, pp. 796-801.
Roxworthy et al., "Multifunctional plasmonic film for recording near-field optical intensity," Nano Letters, 2014, 14: 4687-4693.
Roxworthy et al., "Understanding and controlling plasmon-induced convection," Nature Communications, 2014, 5: 3173.
Saleh et al., "Toward efficient optical trapping of Sub-10-nm particles with coaxial plasmonic apertures," Nano Lett., 2012, vol. 12, pp. 5581-5586.
Santiago et al., "A particle image velocimetry system for microfluidics," Experiments in Fluids, 1998, 25: 316-319.
Sarshar et al., "Comparative Study of Methods to Calibrate the Stiffness of a Single-Beam Gradient-Force Optical Tweezers over Various Laser Trapping Powers," J. Biomed Opt, 2014, 19(11): 115001.
Savinov et al., "Optical Anapoles," Commun. Phys, 2019, 2(1): 69.
Scheibner et al., "Superradiance of quantum dots", Nature Physics, vol. 3, No. 2, 2007, pp. 106-110.
Schietinger et al., "Plasmon-enhanced single photon emission from a nanoassembled metal-diamond hybrid structure at room temperature," Nano Letters, 2009, vol. 9, No. 4., 1694-1698.
Shoji et al., "Plasmonic Optical Tweezers toward Molecular Manipulation: Tailoring Plasmonic Nanostructure, Light Source, and Resonant Trapping," J. Phys. Chem. Lett., vol. 5, No. 17, 2014, pp. 2957-2967.
Shoji et al., "Reversible photoinduced formation and manipulation of a twodimensional closely packed assembly of polystyrene nanospheres on a metallic nanostructure," Journal of Physical Chemistry C, 2013, 117, pp. 2500-2506.
Squires et al., "Induced-charge electro-osmosis," Journal of Fluid Mechanics, 2004, 509: 217-252.
Tanaka et al., "Nanostructured potential of optical trapping using a plasmonic nanoblock pair," Nano Letters, 2013, p. 2146-2150.
Théry et al., "Minimal Information for Studies of Extracellular Vesicles 2018 (MISEV2018): A Position Statement of the International Society for Extracellular Vesicles and Update of the MISEV2014 Guidelines," J. Extracell Vesicles, 2018, 7(1): 1535750.
Totero Gongora et al., "Anapole Nanolasers for Mode-Locking and Ultrafast Pulse Generation," Nat. Commun, 2017, 8 (1): 15535.
Tsubio, "Plasmonic optical tweezers: A long arm and a tight grip", Nature Nanotechnology, vol. 11, 2016, pp. 5-6.
Valadi et al., "Exosome-mediated transfer of mRNAs and microRNAs is a novel mechanism of genetic exchange between cells," Nature Cell Biology, 2007, 9: 654-659.
Volpe et al., "Roadmap for Optical Tweezers," arXiv, 2022, arXiv:2206.13789.
Wang et al., "Plasmonic Trapping with a Gold Nanopillar" ChemPhysChem, 2012, 13: 2639-2648.
Wang et al., "Trapping and rotating nanoparticles using a plasmonic nano-tweezer with an integrated heat sink," Nature Communications, 2011, 2: 469.
Werner et al., "Microfluidic array cytometer based on refractive optical tweezers for parallel trapping, imaging, and sorting of individual cells", Lab on a Chip, 2011, vol. 11, pp. 2432-2439.
Williams et al., "Electrokinetic patterning of colloidal particles with optical landscapes," Lab on a Chip, 2008, 8: 1879-1882.
Wong et al., "The Effect of Integration Time on Fluctuation Measurements: Calibrating an Optical Trap in the Presence of Motion Blur," Opt. Express, 2006, 14(25): 12517-12531.
Xu et al., "Optical Trapping of Nanoparticles Using All-Silicon Nanoantennas," ACS Photonics, 2018, 5(12): 4993-5001.
Yang et al., "Nanoparticle Trapping in a Quasi-BIC System," ACS Photonics, 2021, 8(7): 1961-1971.
Yanik et al., "An Optofluidic Nanoplasmonic Biosensor for Direct Detection of Live Viruses from Biological Media", Nano Letters, vol. 10, No. 12, 2010, pp. 4962-4969.
Yeh et al., "Assembly of ordered colloidal aggregrates by electric-field-induced fluid flow," Nature, 1997, vol. 386, No. 6620, pp. 57-59.
Yoo et al.,, "Low-Power Optical Trapping of Nanoparticles and Proteins with Resonant Coaxial Nanoaperture Using 10 nm Gap," Nano Lett., 2018, pp. 3637-3642.
Zhang et al., "Electrodeposited Magnetic Nanoporous Membrane for High-Yield and High-Throughput Immunocapture of Extracellular Vesicles and Lipoproteins," Commun Biol, 2022, 5(1): 1358.
Zhang et al., "Identification of distinct nanoparticles and subsets of extracellular vesicles by asymmetric flow field-flow fractionation," Nature Cell Biology, 2018, 20: 332-343.
Zhang et al., "Supermeres are functional extracellular nanoparticles replete with disease biomarkers and therapeutic targets," Nature Cell Biology, 2021, 23: 1240-1254.
Zhang et al., "Transfer of Functional Cargo in Exomeres," Cell Reports, 2019, 27: 940-954.e6.
Zheng et al., "Nano-Optical Conveyor Belt, Part II: Demonstration of Handoff Between Near-Field Optical Traps," Nano Lett., vol. 14, No. 6, 2014, pp. 2971-2976.
Hu, Z. W., et al. "In situ 3-D mapping of pore structures and hollow grains of interplanetary dust particles with phase contrast X-ray nanotomography." Meteoritics & Planetary Science 51.9 (2016): 1632-1642.
Ndukaife, J. Massive Parallel Trapping and Enhanced Imaging of Single Nanosized Extracellular Vesicles Using Designer Plasmonic Metasurfaces (slides presented at the 2022 Gordon Research Conference on Plasmonics and Nanophotonics, Newry, Me., Jul. 10-15, 2022), 30 pages.
Hong, C. et al. Optical nanotweezers for single nanosized extracellular vesicles analysis (poster presented at the 2022 Gordon Research

(56) References Cited

OTHER PUBLICATIONS

Conference on Extracellular Vesicles, Newry, Me., Jul. 24-29, 2022), 1 page.

* cited by examiner

SYSTEM AND METHOD OF NANOSCALE OPTICAL TRAPPING AND ANALYSIS USING ENGINEERED DIELECTRIC OPTICAL NANO-ANTENNA

CROSS-REFERENCE TO RELATED APPLICATIONS

This application claims the benefit of U.S. Provisional Application No. 63/614,233 filed Dec. 22, 2023, the entire disclosure of which is incorporated by reference.

STATEMENT REGARDING FEDERALLY SPONSORED RESEARCH

This invention was made with government support under ECCS 2143836 awarded by the National Science Foundation. The government has certain rights in the invention.

FIELD

The present disclosure relates to nanotweezers for manipulating nanoscale objects and, more particularly, to optical nanotweezers employing dielectric nanoantennas and reflector engineered substrates for manipulating nanoscale objects using optical forces.

SUMMARY

Optical tweezers are instruments that use coherent light—typically focused laser beams—to exert optical forces on microscopic particles. Optical tweezers may facilitate the manipulation and trapping of particles without direct physical contact. Optical tweezers have a range of practical applications in fields such as biophysics, cell biology, and nanotechnology, where they can precisely handle cells, subcellular components, and other microscopic specimens under carefully controlled conditions. Most conventional optical tweezers use a high-numerical-aperture objective lens to focus a laser beam and generate a sufficiently strong optical gradient force to trap particles at the microscale. However, as the target particles become smaller—on the order of tens of nanometers—significant technical challenges arise.

For example, the optical gradient force acting on a particle generally scales with the particle's volume. Consequently, trapping particles substantially smaller than the wavelength of the laser light often requires much higher laser power to achieve stable confinement. In the case of biological specimens, it may be preferable to use lasers within the near-infrared biological transparency window (approximately 800 nm to 1,200 nm) to minimize absorption and reduce photothermal heating. Nonetheless, to trap nanoscale biological particles—such as extracellular vesicles (EVs), non-vesicular extracellular nanoparticles (NVEPs), nucleic acids, proteins, lipids, and specialized sub-35 nm particles like exomeres (about 35 nm in size) and supermeres (about 25 nm in size)—conventional approaches can demand input powers exceeding 100 mW. Such high power levels risk causing photothermal damage and compromising the structural integrity or viability of these sensitive specimens.

Systems, apparatuses, methods, and techniques described in this specification provide technical solutions to these challenges (among others) by employing a specialized optical trapping architecture that includes an anapole nanoantenna positioned on a reflector layer. The anapole nanoantenna may be a dielectric disk (for example, silicon) with a nanohole or double-nanohole (DNH) feature at its center. The reflector layer may be implemented as a distributed Bragg reflector (DBR) comprising alternating layers of materials (such as silicon and silicon dioxide) with contrasting refractive indices. A spacer layer is positioned between the DBR and the nanoantenna to optimize the interaction between the nanoantenna and the incident laser light.

In operation, a coherent laser beam (for example, one within the near-infrared biological transparency window) may be directed toward the nanoantenna structure. Upon reaching the reflector layer, the light may undergo multiple internal reflections within the reflector layer, resulting in constructive interference at the target wavelength. This may create a standing wave, which significantly enhances the electric field intensity at the nanoantenna's location. By carefully selecting the thickness of the spacer layer, the anapole nanoantenna may be positioned at the peak of this standing wave, effectively multiplying the background electric field amplitude compared to the incident field.

The enhanced electromagnetic environment provided by this configuration may facilitate the nanoantenna supporting an optical mode known as an anapole state. This state may arise from the interplay between electric and toroidal dipole resonances and may be characterized by strong field confinement within the dielectric nanoantenna. The presence of the nanohole, especially a double-nanohole, may allow this confined electromagnetic energy to be accessible in the near-field region outside the antenna's surface. The nanohole arrangement may also tighten the electromagnetic confinement laterally, leveraging the "slot effect" to create a localized, high-intensity field region at the nanoscale.

When a nanoscale particle is introduced into this localized region, the particle may experience a robust optical gradient force that can trap it stably, overcoming both the diffraction limit and the high power requirements associated with existing designs. By confining light to a deeply subwavelength volume, the system can achieve stable trapping at lower input powers, such as on the order of 10.8 mW. This reduced power level, combined with the all-dielectric design of the nanoantenna (which mitigates thermal losses that are common in metallic nanostructures), minimizes photothermal heating and the associated risks of damaging delicate biological specimens.

Thus, the combination of the DBR, spacer layer, anapole nanoantenna, and the nanohole aperture provides technical solutions to the longstanding challenges in nanoscale optical trapping. By enhancing the electromagnetic field while reducing energy losses and heat generation, this design facilitates the efficient, low-power optical trapping of nanoparticles as small as 25 nm. As a result, researchers may use the system to study and manipulate nanoscale biological entities-including EVs, NVEPs, exomeres, and supermeres-without compromising their structural integrity or function, significantly broadening the capabilities and applications of optical tweezers at the nanoscale.

A nanotweezer, includes an anapole nanoantenna having a double nanohole formed through a central region of the anapole nanoantenna, a spacer layer positioned between the anapole nanoantenna and a reflector layer, and a light source configured to illuminate the antenna on the reflector layer. Upon illumination of the antenna on the reflector layer by the light source, an optical gradient force is generated at the double nanohole.

In other features, the reflector layer includes a first dielectric layer and a second dielectric layer. In other features, the first dielectric layer and the second dielectric layer have contrasting refractive indices. In other features, the reflector layer includes a plurality of alternating dielectric layers having contrasting refractive indices and a metal layer. The metal layer includes gold. In other features, the anapole nanoantenna includes a silicon material. In other features, the spacer layer includes a silicon dioxide material. In other features, the first dielectric layer includes a silicon dioxide material. In other features, the second dielectric layer includes a silicon material.

In other features, the light source is configured to emit a laser having a wavelength in a range of between about 800 nanometers to about 1,200 nanometers. In other features, the anapole nanoantenna has a thickness of about 130 nanometers, the double nanohole is a double-nanohole slot include two substantially circular holes connected by a slot-shaped opening having a width of about 30 nm, the spacer layer has a thickness of about 250 nanometers, the first dielectric layer has a thickness of about 168 nanometers, and the second dielectric layer has a thickness of about 71 nanometers.

A method for generating an optical gradient force at a nanotweezer, includes illuminating the nanotweezer with a light source, the nanotweezer includes an anapole nanoantenna having a double nanohole formed through a central region of the anapole nanoantenna, and a spacer layer positioned between the anapole nanoantenna and a reflector layer.

In other features, the reflector layer includes a first dielectric layer and a second dielectric layer. In other features, the first dielectric layer and the second dielectric layer have contrasting refractive indices. In other features, the reflector layer includes a plurality of alternating dielectric layers having contrasting refractive indices and a metal layer. The metal layer includes gold. In other features, the anapole nanoantenna includes a silicon material. In other features, the spacer layer includes a silicon dioxide material. In other features, the first dielectric layer includes a silicon dioxide material. In other features, the second dielectric layer includes a silicon material.

In other features, the light source is configured to emit a laser having a wavelength in a range of between about 800 nanometers to about 1,200 nanometers. In other features, the anapole nanoantenna has a thickness of about 130 nanometers, the double nanohole is a double-nanohole slot include two substantially circular holes connected by a slot-shaped opening having a width of about 30 nm, the spacer layer has a thickness of about 250 nanometers, the first dielectric layer has a thickness of about 168 nanometers, and the second dielectric layer has a thickness of about 71 nanometers.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Figure 1:
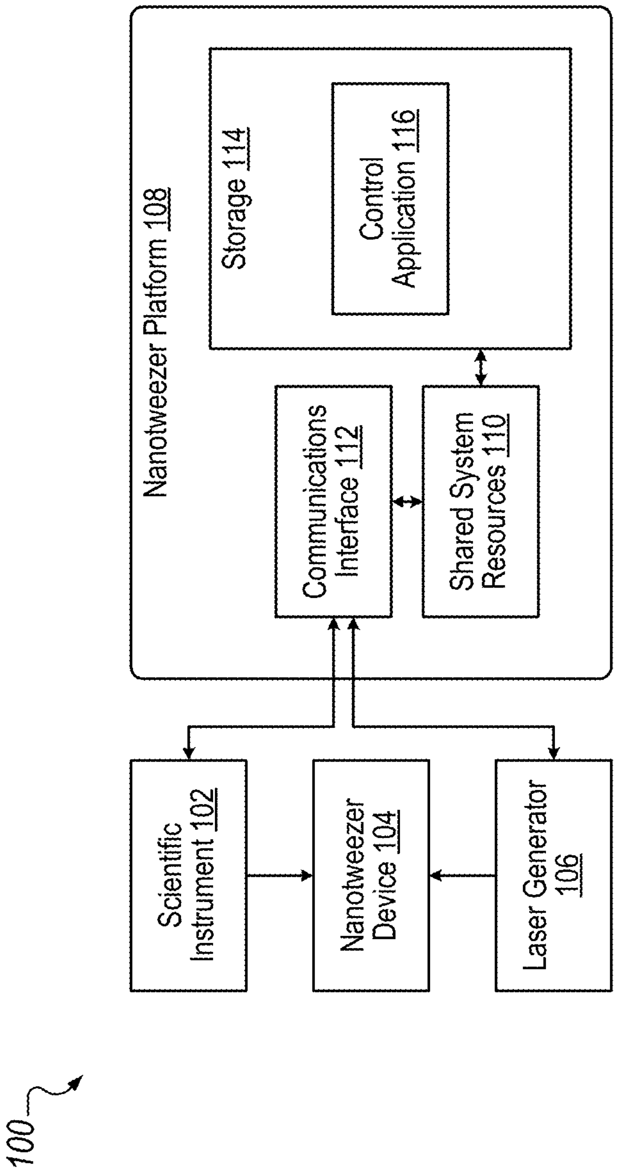
FIG. 1 is a block diagram of a system for trapping and analyzing nanoscale particles, according to some examples.

FIG. 1 is a block diagram of a system 100 for trapping and analyzing nanoscale particles, according to some examples. As illustrated in FIG. 1, the system 100 may include one or more instruments for analyzing the nanoscale particles, such as a scientific instrument 102, a nanotweezer device 104 for trapping and/or isolating one or more nanoscale particles, and a light source for illuminating one or more areas of the nanotweezer device 104 with one or more coherent, focused light beams such as one or more lasers. In various implementations, the system 100 includes one or more computing platforms for controlling the scientific instrument 102 and/or laser generator 106, such as the nanotweezer platform 108.

In various implementations, the laser generator 106 is configured to output a laser with a wavelength in the range of about 800 nm to about 1,200 nm. In some examples, the laser generator 106 outputs a laser with a wavelength of about 973 nm, which may correspond to the resonance of the anapole nanoantenna. In various implementations, the laser generator 106 outputs a laser with a power in the range of about 5 mW to about 100 mW. In some examples, the laser generator 106 outputs a laser with a power of about 6.8 mW, about 10.8 mW, or about 19 mW, depending on the specific requirements for trapping and manipulating nanoscale particles. In various implementations, the laser generator 106 is configured to control polarization of the laser. For example, the laser polarization may be linear and aligned with the geometry of the nanoantenna, such as along the axis of the nanohole or double nanohole, to maximize field enhancement and trapping efficiency. In some examples, the laser generator 106 outputs the laser in a continuous wave (CW) mode, providing a steady and stable beam that avoids fluctuations in trapping force, ensuring consistent trapping performance.

The nanotweezer platform 108 may include system resources 110, a communications interface 112, and/or non-transitory computer-readable storage media such as storage 114. The system resources 110 may include one or more electronic processors and/or one or more graphics processing units for executing instructions stored in the storage 114, volatile computer memory, non-volatile computer memory, and/or one or more system buses interconnecting the components of the nanotweezer platform 108 (such as any of the previously described components). In the example of FIG. 1, the storage 114 includes a control application 116 that controls operation of the scientific instrument 102 and/or the laser generator 106, for example, according to the functionality described herein.

Figure 2:
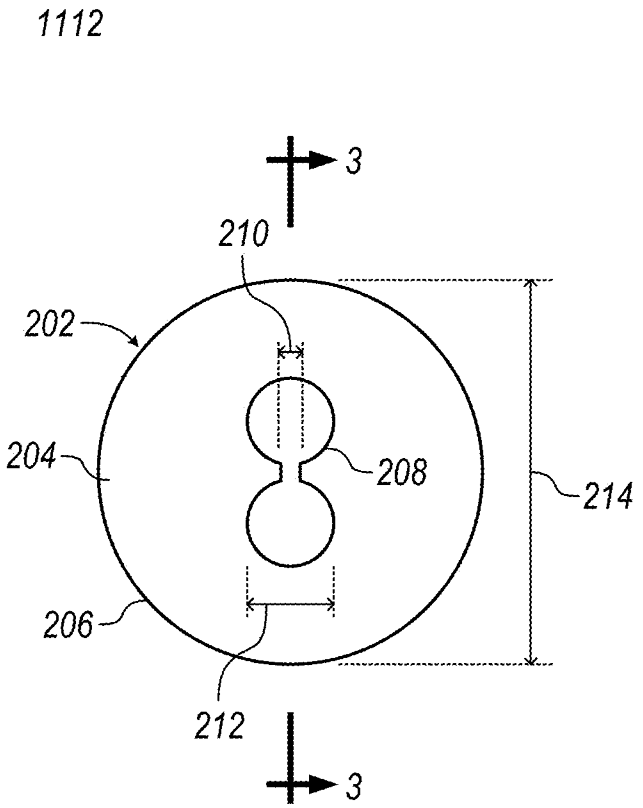
FIG. 2 is a top view of an anapole nanoantenna, according to some examples.
Figure 3:
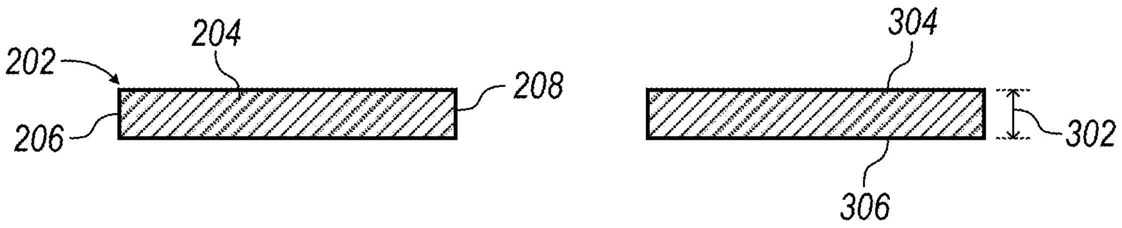
FIG. 3 is a cross-sectional view of the anapole nanoantenna of FIG. 2 taken at line 3-3, according to some examples.

FIG. 2 is a top view of an anapole nanoantenna 202, according to some examples. FIG. 3 is a cross-sectional view of the anapole nanoantenna 202 of FIG. 2 taken at line 3-3, according to some examples. Referring collectively to FIGS. 2 and 3, the anapole nanoantenna 202 may include a dielectric disk 204 characterized by a periphery 206 and a thickness 302. The thickness 302 may be defined as a distance between a top surface 304 and a bottom surface 306 of the dielectric disk 204. In various implementations, the periphery 206 has a substantially circular shape, while the top surface 304 and the bottom surface 306 are substantially planar and parallel.

A nanohole 208 may be formed through the dielectric disk 204, extending from the top surface 304 to the bottom surface 306 and located substantially at the center of the dielectric disk 204. In some implementations, the nanohole 208 takes the form of a double-nanohole slot, consisting of two substantially circular holes connected by a slot-shaped opening. The slot may be defined by a width 210, while the circular holes may each be defined by a diameter 212. For example, the width 210 may be about 30 nm, and the diameter 212 may be in a range of between about 30 nm and about 200 nm. In various implementations, the diameter 212 is set to about 160 nm (or a radius of about 80 nm). The center-to-center distance between the two circular holes of the nanohole 208 may be set to about 180 nm.

In some implementations, the thickness 302 of the dielectric disk 204 is about 130 nm, and a diameter 214 of the dielectric disk 204 is about 910 nm (or a radius of about 455 nm). These dimensions may be particularly suitable for use with a laser having a wavelength of approximately 973 nm, polarized along an axis orthogonal to the length of the nanohole 208 and parallel to the top surface 304 and bottom surface 306. The nanoantenna 202 may be constructed from silicon or any other suitable dielectric material.

Figure 4:
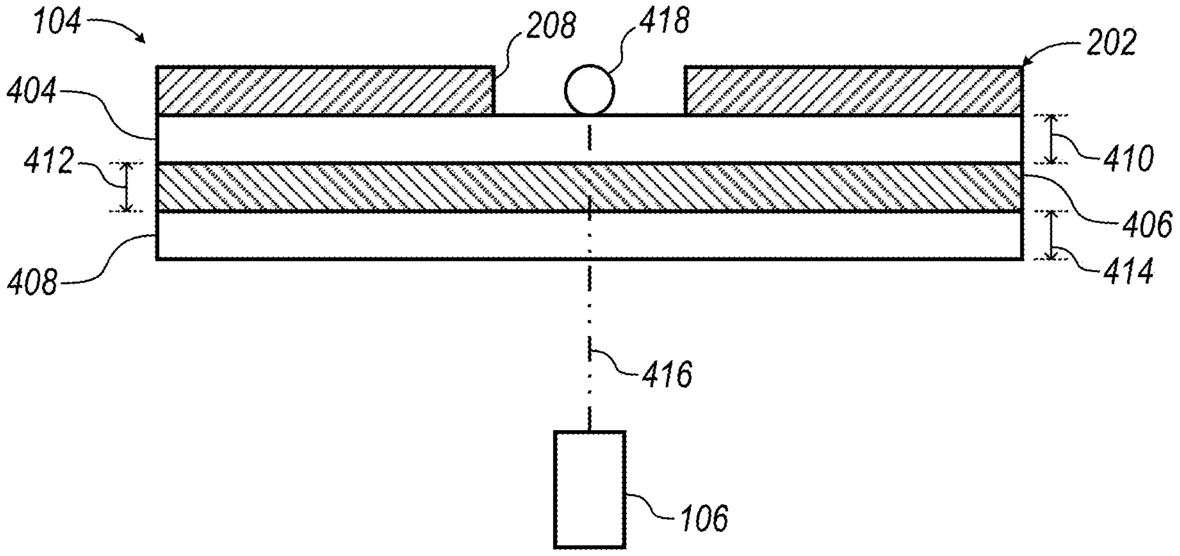
FIG. 4 is a cross-sectional view of an assembled nanotweezer device, according to some examples.

FIG. 4 is a cross-sectional view of an assembled nanotweezer device 104, according to some examples. In the example of FIG. 4, the nanotweezer device 104 includes the dielectric disk 204 of FIGS. 2 and 3, a spacer layer 404, a first dielectric layer 406, and a second dielectric layer 408 arranged in a stacked configuration. For example, the peripheries of the dielectric disk 204, spacer layer 404, first dielectric layer 406, and second dielectric layers 408 may be substantially coextensive (e.g., overlapping and having the same shape and dimensions).

The spacer layer 404 may have a thickness 410 defined by its top and bottom planar surfaces. Similarly, the first dielectric layer 406 may have a thickness 412, and the second dielectric layer 408 may have a thickness 414, both defined by their respective top and bottom planar surfaces. The bottom surface 306 of the dielectric disk 204 may be in substantial contact with the top surface of the spacer layer 404. In turn, the bottom surface of the spacer layer 404 may be in substantial contact with the top surface of the first dielectric layer 406, and the bottom surface of the first dielectric layer 406 may be in substantial contact with the top surface of the second dielectric layer 408.

In various implementations, the spacer layer 404 includes a silicon dioxide material. In some examples, the first dielectric layer 406 and second dielectric layer 408 are configured as a distributed Bragg reflector (DBR), which may include alternating layers materials with contrasting refractive indices (e.g., high and low refractive indices). For instance, the first dielectric layer 406 may include a material having a lower refractive index, such as a silicon dioxide material, while the second dielectric layer 408 may include a material having a higher refractive index, such as a silicon material. Although FIG. 4 illustrates only a single first dielectric layer 406 and a second dielectric layer 408, other implementations of the nanotweezer device 104 can include additional alternating pairs of these dielectric layers. The first dielectric layers 406 and the second dielectric layers 408 may be collectively referred to as a reflective layer.

During operation, the laser generator 106 may illuminate the nanotweezer device 104 with a laser beam 416. The control application 116 may command the laser generator 106 to direct the laser beam at the nanotweezer device 104, inducing an optical anapole state within the anapole nanoantenna 202. Optical anapole states arise from the destructive interference between electric and toroidal dipole resonances, resulting in unique light-confinement mechanisms in all-dielectric nanostructures. The nanotweezer device 104 may leverage these optical anapole states to achieve nanoscale light confinement and generate a highly localized optical gradient force capable of trapping nanoscale particles. Optical anapoles also facilitate additional applications such as anapole-based lasers and second-harmonic generation due to their highly intensified local electromagnetic fields.

In general, the electromagnetic energy associated with anapole states is strongly confined within the dielectric disk 204 of the anapole nanoantenna 202 and is not directly accessible in the surrounding medium. To enable access to this confined field for near-field interactions—such as trapping biological molecules or nanoparticles—the nanohole 208 is introduced at the center of the dielectric disk 204. This nanohole 208 may facilitate the coupling of the enhanced electromagnetic field to nearby particles. Specifically, the double-nanohole configuration of the nanohole 208 described in FIG. 2 may further enhances the optical field due to the slot effect, which arises from the continuity of the displacement field's normal component across the dielectric interface. The slot effect may create highly localized electromagnetic confinement in the x-y plane, further amplifying the field intensity.

The mode volume of the electromagnetic field within the nanohole 208 may be comparable to the physical size of trapped nanoscale particles, such as particle 418. This precise size matching may offer significant technical advantages for optical trapping, including robust spatial confinement and enhanced interaction between the electromagnetic field and the trapped particle 418. By exploiting the geometry of the nanohole 208, the nanotweezer device 104 may achieve high trapping efficiency, making it particularly effective for analyzing and manipulating individual nanoscale particles, including biological entities and other nanoscale specimens.

In various implementations, the thickness 410 of the spacer layer 404 may be sized to support a second order anapole state near the wavelength of the laser beam 416 generated by the laser generator 106. For example, when the laser beam 416 has a wavelength of about 973 nm, the thickness 410 of the spacer layer 404 may be set to a value of about 250 nm. In some examples, the thickness 412 of the first dielectric layer 406 is about 71 nm. In various implementations, the thickness 414 of the second dielectric layer 408 is about 168 nm.

Figure 5:
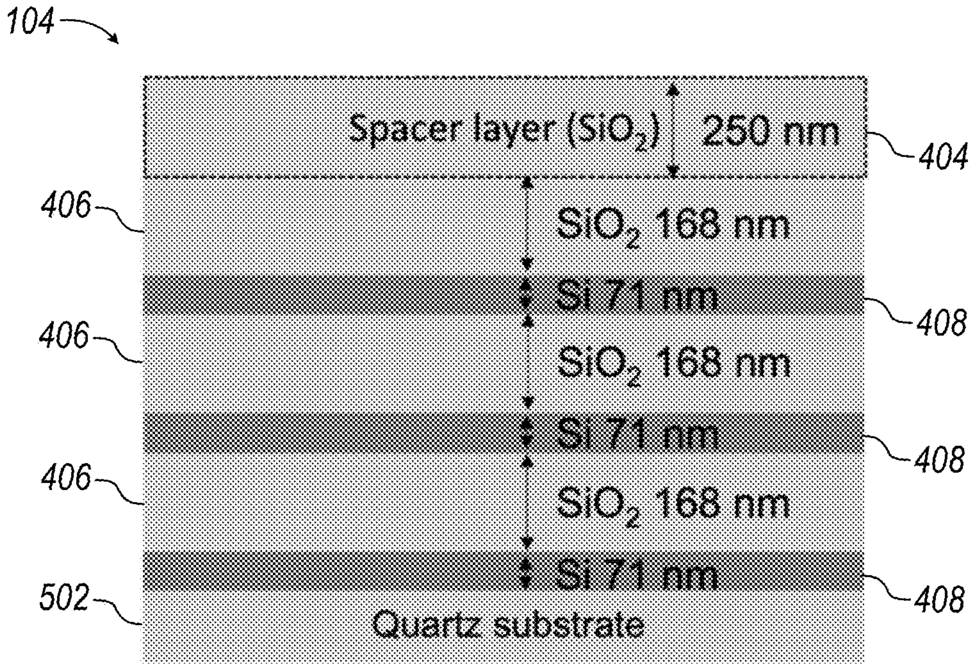
FIG. 5 is a cross-sectional view illustrating additional details of a nanotweezer device, according to some examples.

FIG. 5 is a cross-sectional view illustrating additional details of the nanotweezer device 104, according to some examples. In various implementations, the anapole nanoantenna 202 (not shown) may be positioned on a distributed Bragg reflector (DBR) comprising three pairs of alternating first dielectric layers 406 and second dielectric layers 408. The DBR may be stacked on a quartz substrate 502. The first dielectric layers 406 may consist of silicon dioxide, while the second dielectric layers 408 may consist of silicon, providing a high refractive index contrast critical for efficient reflection. In various implementations, the DBR may include one or more metal layers, such as a gold layer. For example, a metal layer may be positioned between the alternating dielectric layers and the anapole nanoantenna 202. In some examples, a metal layer may be positioned between any of the dielectric layers. In various implementations, a metal layer may be positioned between the dielectric layers and the quartz substrate 502.

Figure 6:
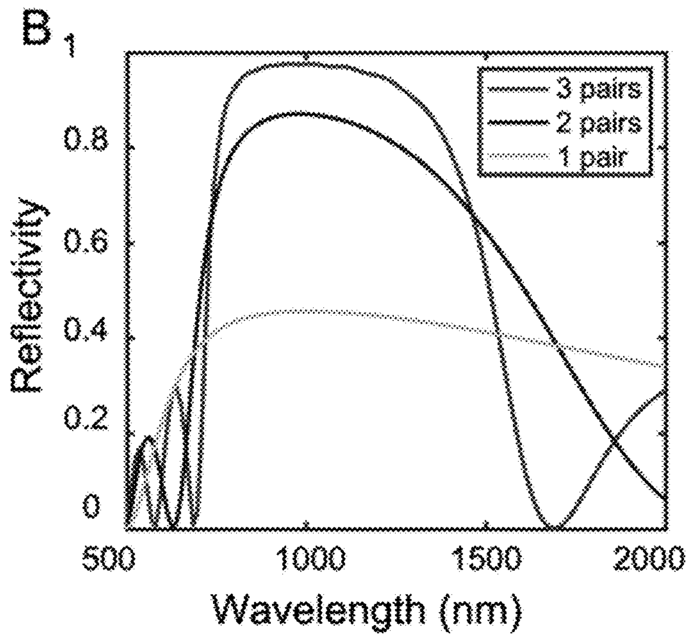
FIG. 6 is a chart illustrating details associated with various configurations of a nanotweezer device, according to some examples.

FIG. 6 is a chart illustrating details associated with various configurations of the nanotweezer device 104, according to some examples. As shown in FIG. 6, the configuration of FIG. 5, with three alternating pairs of first dielectric layers 406 and second dielectric layers 408, achieves a reflectivity of about 95% for incident photons near the 973 nm wavelength of the laser beam 416. To further optimize the interaction between the anapole nanoantenna 202 and the reflected light, the spacer layer 404 may be deposited onto the DBR to position the nanoantenna at a constructive interference peak in the standing wave pattern.

Figure 7:
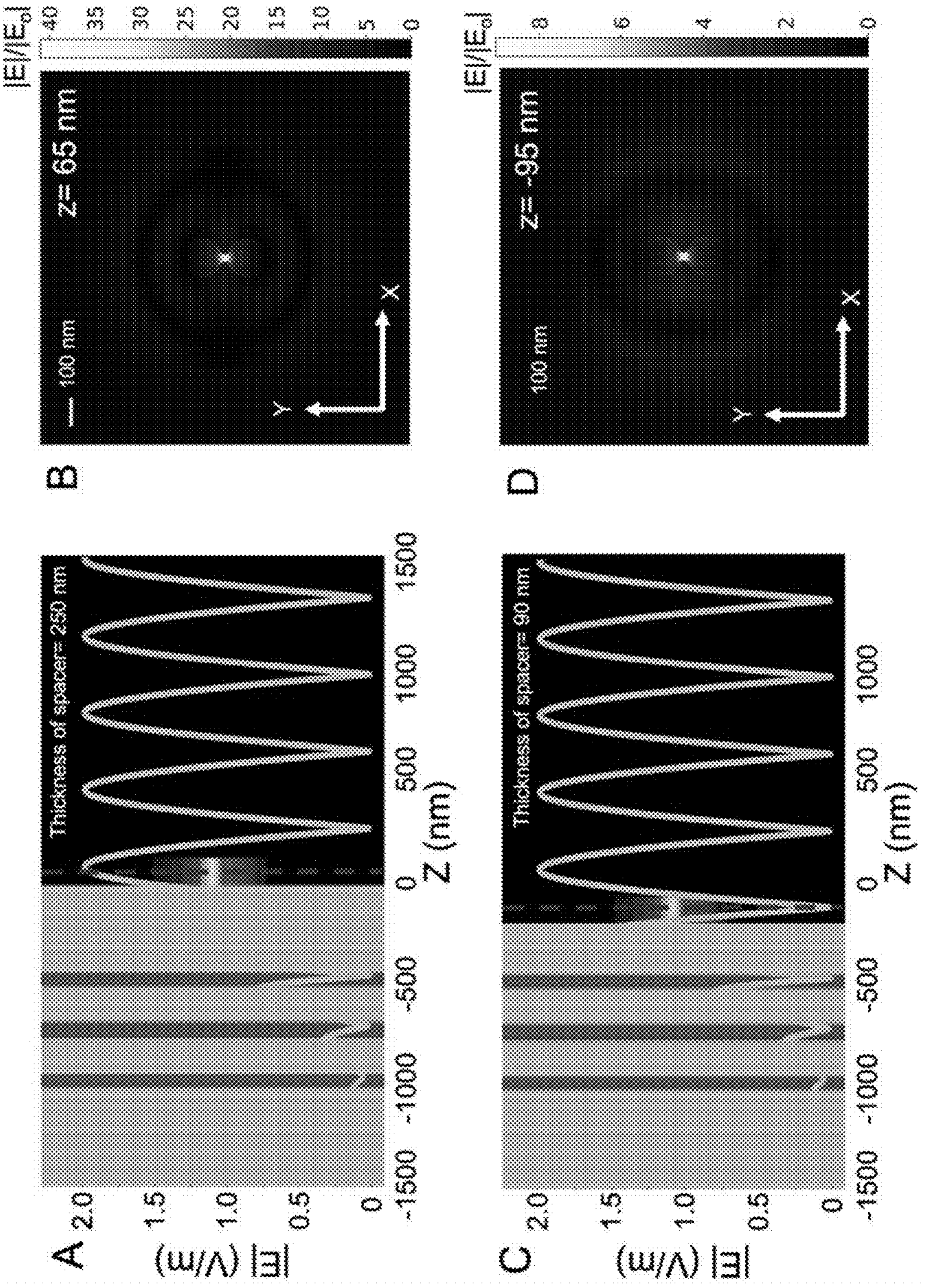
FIG. 7 presents a series of charts illustrating the performance characteristics of various configurations of the nanotweezer device 104, according to some examples.

FIG. 7 presents a series of charts illustrating the performance characteristics of various configurations of the nanotweezer device 104, according to some examples. In some examples, the configuration and thickness of the spacer layer 404 may be critical parameters for optimizing the interaction between the anapole nanoantenna 202 and the incident laser beam. Chart A in FIG. 7 depicts the background electric field (represented by a sinusoidal wave) generated by the DBR when the thickness 410 of the spacer layer 404 is set to approximately 250 nm. This thickness positions the anapole nanoantenna 202 at a peak in the standing wave at z=65 nm, facilitating maximum constructive interference. Chart B in FIG. 7 illustrates the electric field enhancement in the x-y plane at z=65 nm, showing a maximum enhancement factor ($|E|/|E_0|$) of about 41 times.

Chart C in FIG. 7 illustrates the background electric when the thickness 410 of the spacer layer 404 is set to about 90 nm, which positions the anapole nanoantenna 202 at a field minimum near z=−95 nm. This configuration achieves reduced enhancement, as seen in Chart D, which shows the electric field enhancement in the x-y plane at z=−95 nm, with a maximum enhancement factor ($|E|/|E_0|$) of about 9 times. These results highlight the importance of the thickness 410 of the spacer layer 404 for tuning the performance of the nanotweezer device 104 to achieve optimal trapping efficiency and field confinement.

Figure 8:
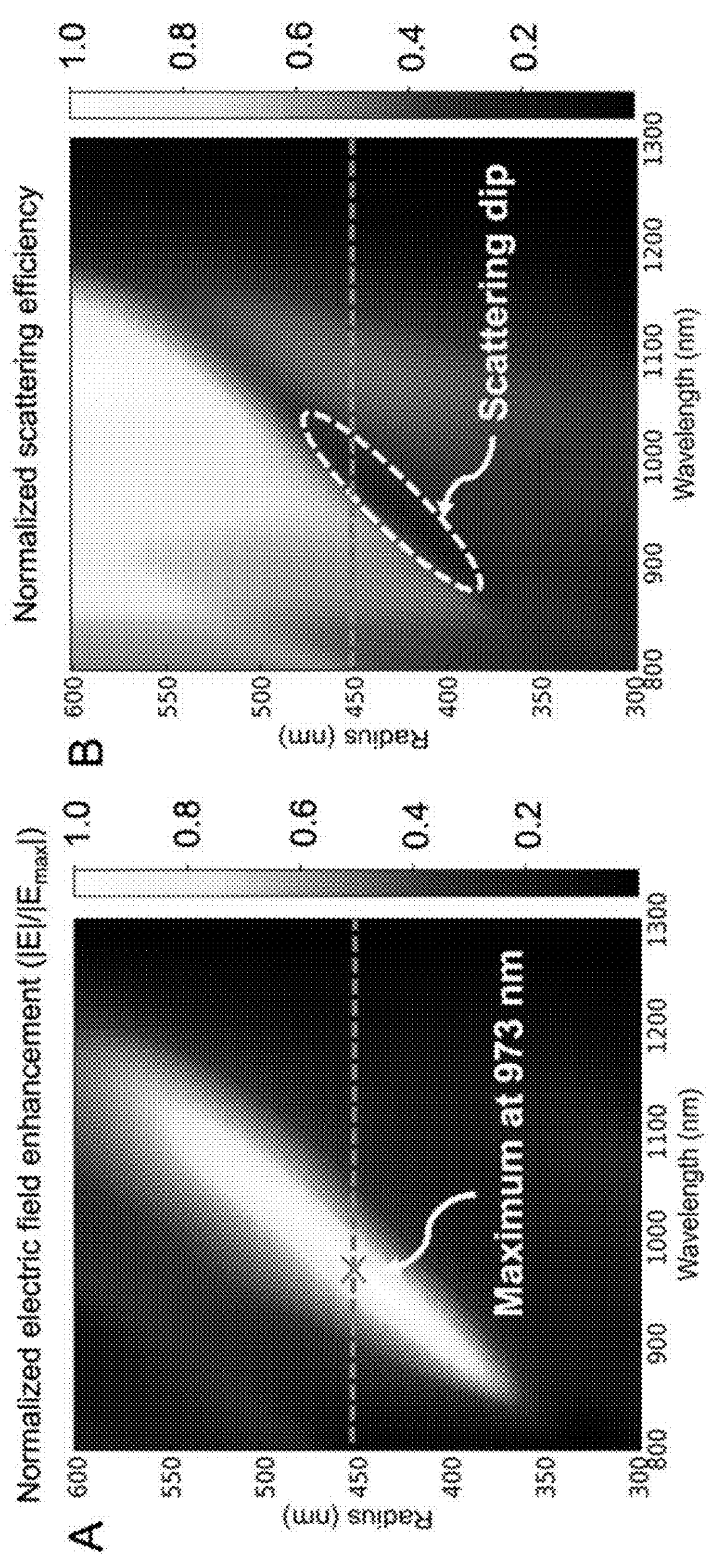
FIG. 8 presents a series of charts illustrating the performance characteristics of various configurations of the nanotweezer device 104, according to some examples.

FIG. 8 presents a series of charts illustrating the performance characteristics of various configurations of the nanotweezer device 104, according to some examples. In various implementations, the thickness 302 of the dielectric disk 204 in the anapole nanoantenna 202 is set to about 130 nm, and the diameter 214 is about 910 nm (or a radius of about 455 nm). The charts in FIG. 8 detail a parametric sweep of the radius of the anapole nanoantenna 202, aimed at optimizing field enhancement and identifying the suppressed scattering dip.

Chart A of FIG. 8 illustrates the electric field enhancement ($|E|/|E_{max}|$) achieved at different radii of the dielectric disk 204. It reveals that maximum field enhancement may be attained when the diameter 214 is about 910 nm (or a radius of 455 nm), with the disk thickness 302 fixed at 130 nm. Chart B of FIG. 8 shows the scattering efficiency of the dielectric disk 204, highlighting a suppressed scattering dip near the operational wavelength of 973 nm, which corresponds to the resonance condition for the anapole state.

To further optimize trapping performance, a parametric radius sweep of the anapole nanoantenna 202 may be conducted with the thickness 302 fixed at 130 nm. The geometric parameters of the double-nanohole (DNH) slot (nanohole 208) are set as follows: the gap width 210 is approximately 30 nm, the diameter 212 of each circular hole is about 160 nm (or a radius of 80 nm), and the center-to-center distance between the holes is about 180 nm. These parameters may be chosen to maximize field enhancement while maintaining precise nanoscale confinement.

Simulation results in FIG. 8 illustrate the outcomes of the parametric radius sweep conducted over a range of radii from approximately 300 nm to 600 nm. The results are based on x-polarized incident light. These simulations demonstrate that an optimized anapole nanoantenna radius significantly enhances the localized electric field while maintaining efficient light confinement and suppression of scattering losses.

Figure 9:
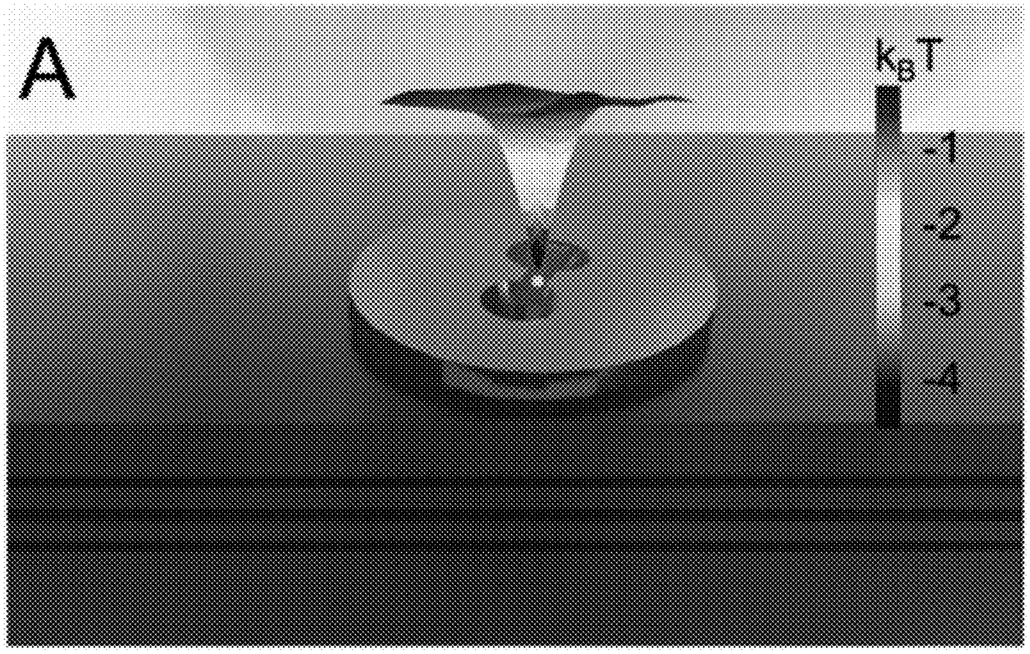
FIG. 9 illustrates an anapole nanoantenna with an estimated optical trapping potential well depth when illuminated with a laser beam, according to some examples.

FIG. 9 illustrates the anapole nanoantenna 202 with an estimated optical trapping potential well depth of approximately 4.6 $k_BT$ for a 50 nm extracellular vesicle (EV) when illuminated with a laser beam at an input power of about 19 mW, according to some examples. This depth indicates the strength of the optical trapping force generated by the enhanced electromagnetic field localized at the double-nanohole (DNH) aperture of the nanohole 208. The trapping potential may be directly influenced by the geometry of the nanohole, the resonance conditions of the anapole state, and/or the laser's power and wavelength.

Figure 10:
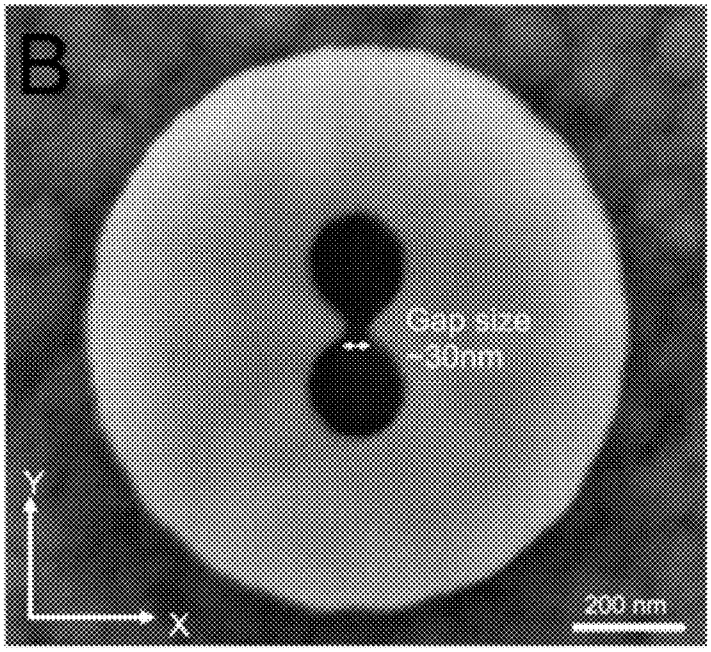
FIG. 10 presents a scanning electron microscope image of an example fabricated anapole nanoantenna, according to some examples.

FIG. 10 presents a scanning electron microscope (SEM) image of an example fabricated anapole nanoantenna 202, highlighting the nanohole 208, which is designed as a double-nanohole aperture, according to some examples. The DNH aperture comprises two circular holes connected by a narrow slot, with carefully tuned dimensions to optimize field enhancement and spatial confinement. Specifically, the gap width 210 of the slot is approximately 30 nm, and each circular hole has a diameter 212 of about 160 nm. The center-to-center distance between the two circular holes is about 180 nm. These design features may be critical for maximizing the localized electric field and ensuring efficient trapping of nanoscale particles, such as EVs.

Figure 11:
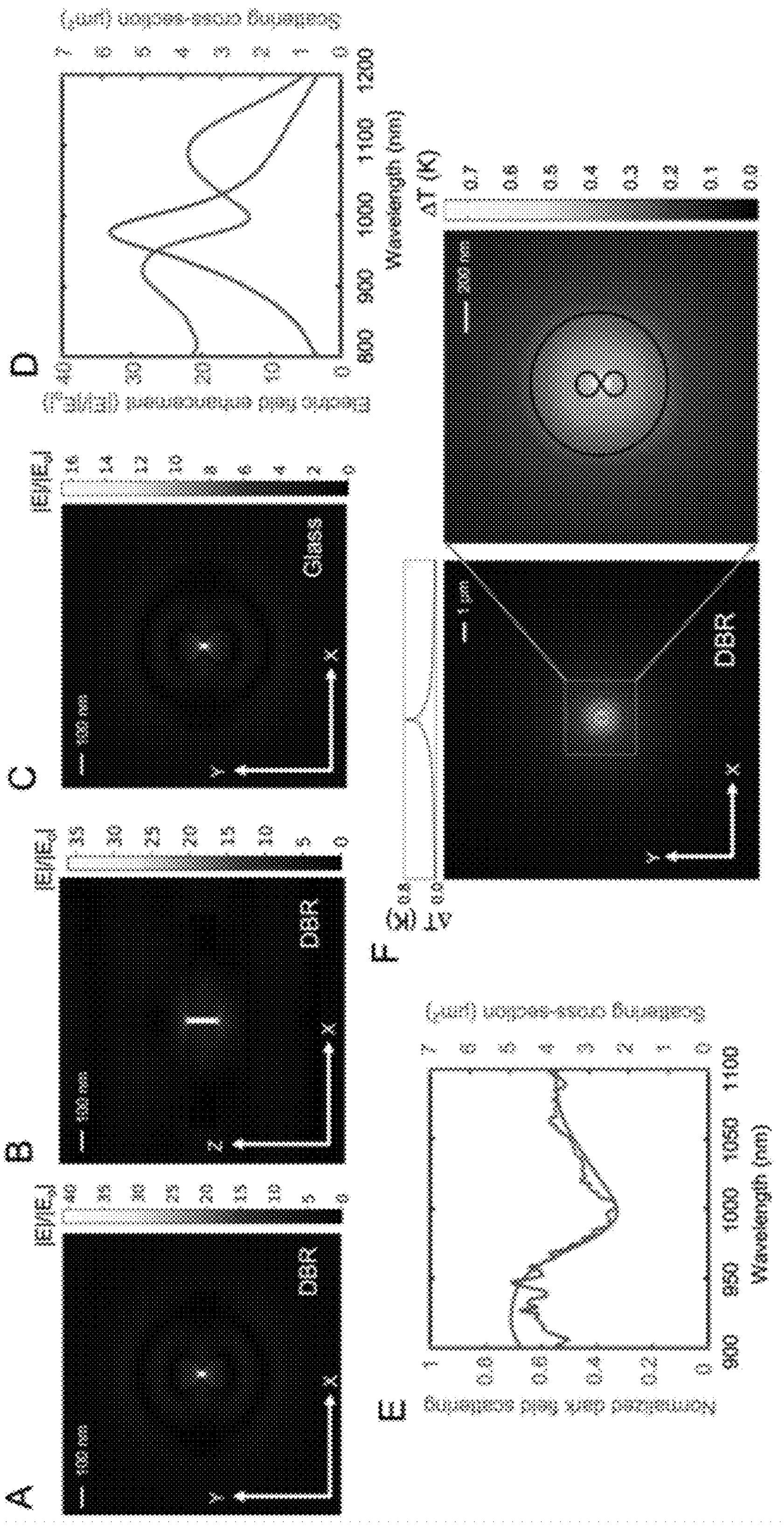
FIG. 11 presents a sequence of charts illustrating key performance characteristics of an anapole nanoantenna, according to some examples.

FIG. 11 presents a sequence of charts illustrating key performance characteristics of the anapole nanoantenna 202, emphasizing its ability to support efficient optical trapping and field enhancement, according to some examples. These charts specifically explore the excitation of the anapole state and the resultant electric field distribution at a laser wavelength of 973 nm. Chart A of FIG. 11 demonstrates the distribution of electric field enhancement in the x-y plane, captured at a height of 65 nm above the DBR reflector. Chart B of FIG. 11 illustrates the electric field enhancement in the x-y plane at the midplane of the anapole disk. Chart C of FIG. 11 compares the field enhancement in the x-y plane for a similar anapole disk placed on a simple glass substrate. Chart D of FIG. 11 examines the scattering cross-section and electric field enhancement for the anapole nanoantenna 202 with an optimized geometry: a radius of 455 nm and a thickness of 130 nm. Chart E of FIG. 11 illustrates agreement between measured dark-field scattering spectra and simulated predictions. Chart F of FIG. 11 presents the results of thermal simulations, demonstrating that the maximum temperature rise induced by operation of the anapole nanoantenna 202 is approximately 0.75 K along the x-y plane.

The electromagnetic near-field profiles associated with the anapole state are depicted in Charts A and B of FIG. 11, which illustrate the electric field enhancement achieved by the anapole nanoantenna 202. The maximum electric field enhancement ($|E|/|E_0|$) is as high as about 41 times, corresponding to an intensity enhancement of about 1,600 times, and is localized within the double-nanohole (DNH) slot, as illustrated in Chart A of FIG. 11. This significant enhancement is a result of precise geometric optimization of the DNH structure, which confines the electromagnetic field tightly along both the x and y directions.

Figure 12:
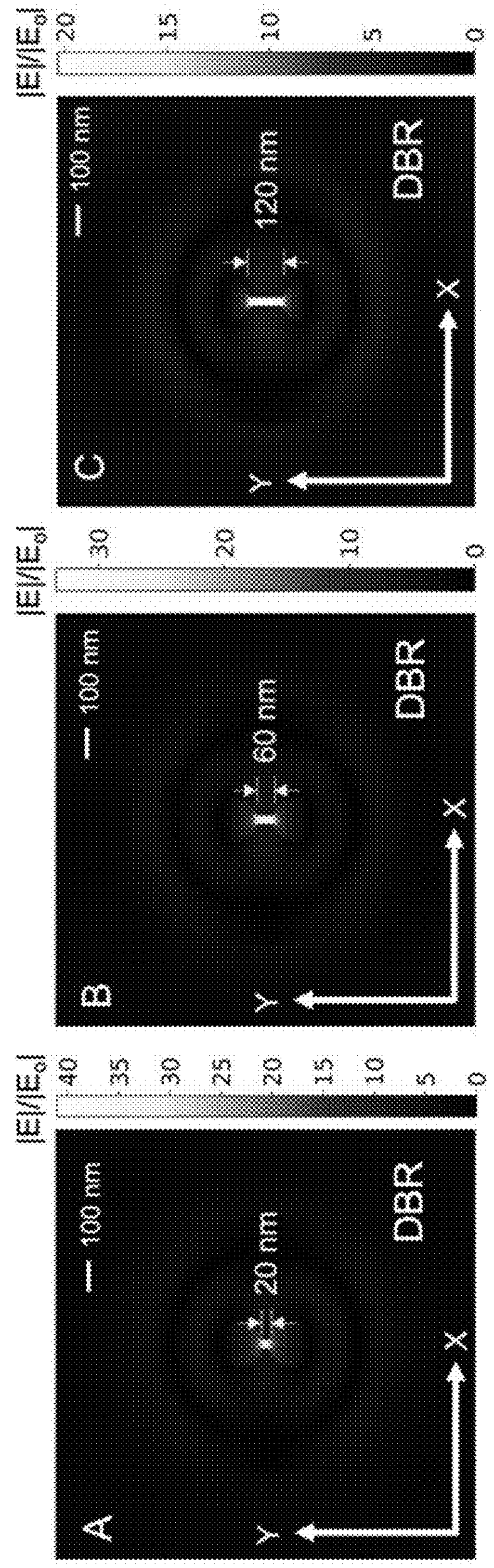
FIG. 12 is a series of charts illustrating the influence of nanohole geometry on field enhancement, according to some examples.

FIG. 12 is a series of charts illustrating the influence of DNH geometry on field enhancement, according to some examples. Charts A-C of FIG. 12 illustrate the electric field distribution across the x-y plane at z=65 nm for varying center-to-center distances between the cusps of the DNH. Chart A of FIG. 12 depicts the field distribution when the cusp width of the DNH is 20 nm. In Chart B of FIG. 12, the cusp width is increased to 60 nm. Chart C of FIG. 12 shows the field distribution for a cusp width of 120 nm.

Returning to FIG. 11, the field enhancement achieved by the anapole nanoantenna 202 is an order of magnitude higher than that observed in Mie-resonant dielectric nanoantennas. This significant enhancement, combined with the spatial confinement of the optical field, may be critical for generating strong optical forces on nanoscale biological particles while operating at low laser power levels. Chart B of FIG. 11 illustrates the field profile along the x-z plane at the midplane of the silicon disk. This profile shows that the field extends into the adjoining fluid medium, making it accessible to particles in the surrounding environment.

Chart C of FIG. 11 demonstrates the electric field enhancement for a similar anapole nanoantenna placed on a glass substrate without the inclusion of the DBR reflector. In this configuration, the maximum enhancement factor is only about 16 times, significantly lower than the enhancement achieved with the DBR reflector. A comparison of the field distributions in Chart A (anapole nanoantenna 202 on DBR) and Chart C (anapole nanoantenna 202 on glass substrate) highlights the substantial increase in field intensity provided by the DBR layer. The enhanced constructive interference enabled by the DBR significantly amplifies the anapole state, facilitating much higher field intensities relative to a glass substrate.

The calculated scattering cross-section and corresponding electric field enhancement are shown in Chart D of FIG. 11. Scattering is suppressed at the anapole state, where the electric field enhancement is maximized. Experimental validation of the performance of the anapole nanoantenna 202 was conducted using a dark-field setup to measure the scattering spectrum of the fabricated device. As expected, the measured spectrum revealed a dip corresponding to the anapole resonance. Chart E of FIG. 11 compares the simulated and measured scattering spectra, showing excellent agreement and verifying the accuracy of the numerical models. The dark-field scattering measurements were conducted using a supercontinuum light source in conjunction with a condenser to isolate and collect scattered light from the anapole nanoantenna, as further detailed in FIG. 13.

Figure 13:
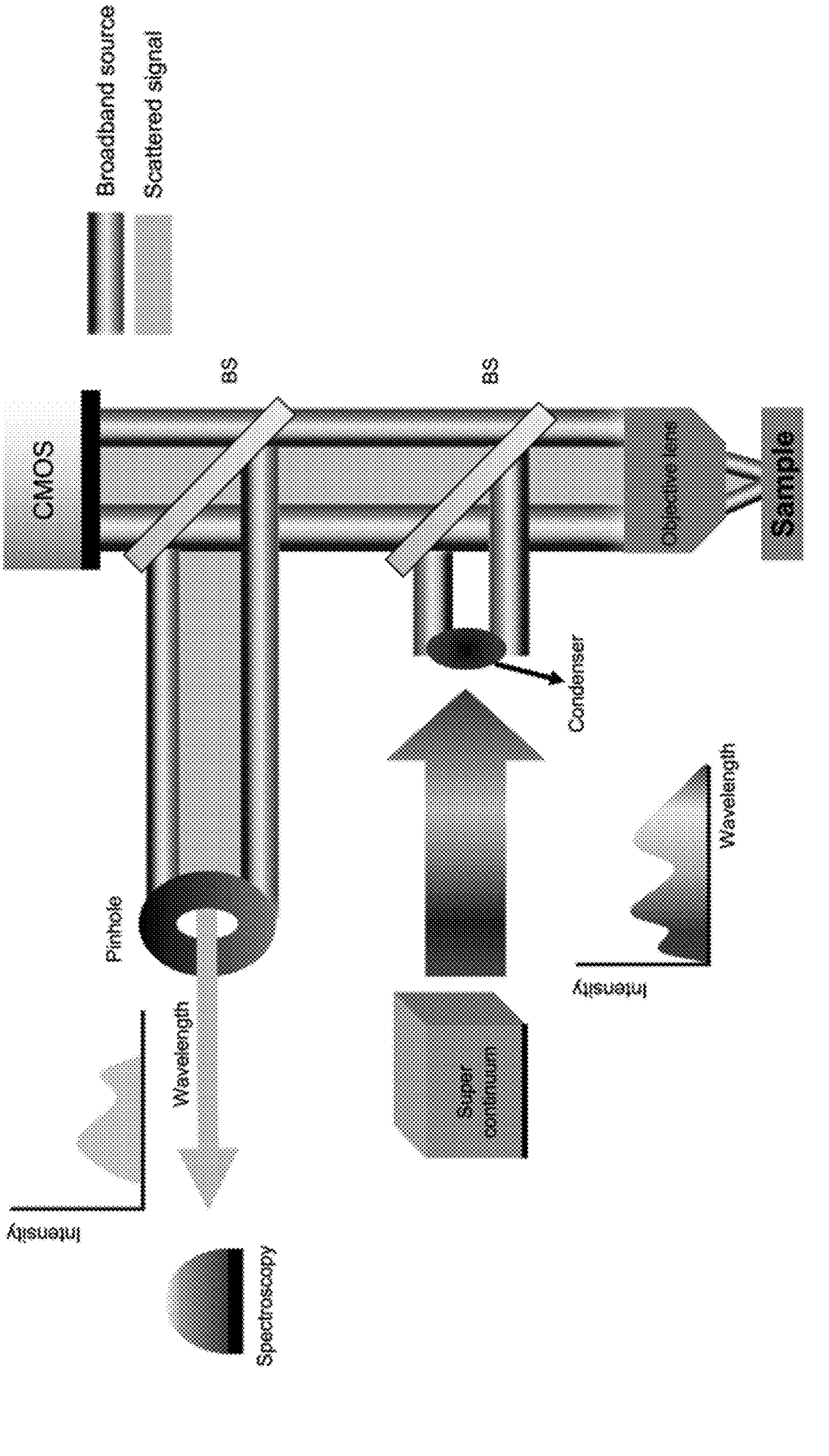
FIG. 13 is a schematic diagram illustrating an experimental setup used for dark-field scattering measurements of an anapole nanoantenna, according to some examples.

FIG. 13 is a schematic diagram illustrating the experimental setup used for dark-field scattering measurements of the anapole nanoantenna 202, according to some examples. As shown in FIG. 13, a collimated supercontinuum light source (SuperK EXTREME, NKT Photonics) was employed to illuminate the sample. The incident light was directed through a condenser to focus the beam onto the nanoantenna sample. To isolate the scattered light, a pinhole setup was implemented within the condenser system, allowing only scattered signals to be collected. The scattered light was subsequently analyzed using a spectrometer (Maya2000 Pro, Ocean Optics), ensuring precise characterization of the scattering spectrum.

Thermal simulations were conducted to evaluate the temperature rise induced by the operation of the anapole nanoantenna 202 on the distributed Bragg reflector (DBR) system. These simulations were performed using the Wave Optics Module and the Heat Transfer Module within the COMSOL Multiphysics (version 5.6) software package. The optical and thermal analyses were coupled to assess the system's steady-state thermal behavior.

Figure 14:
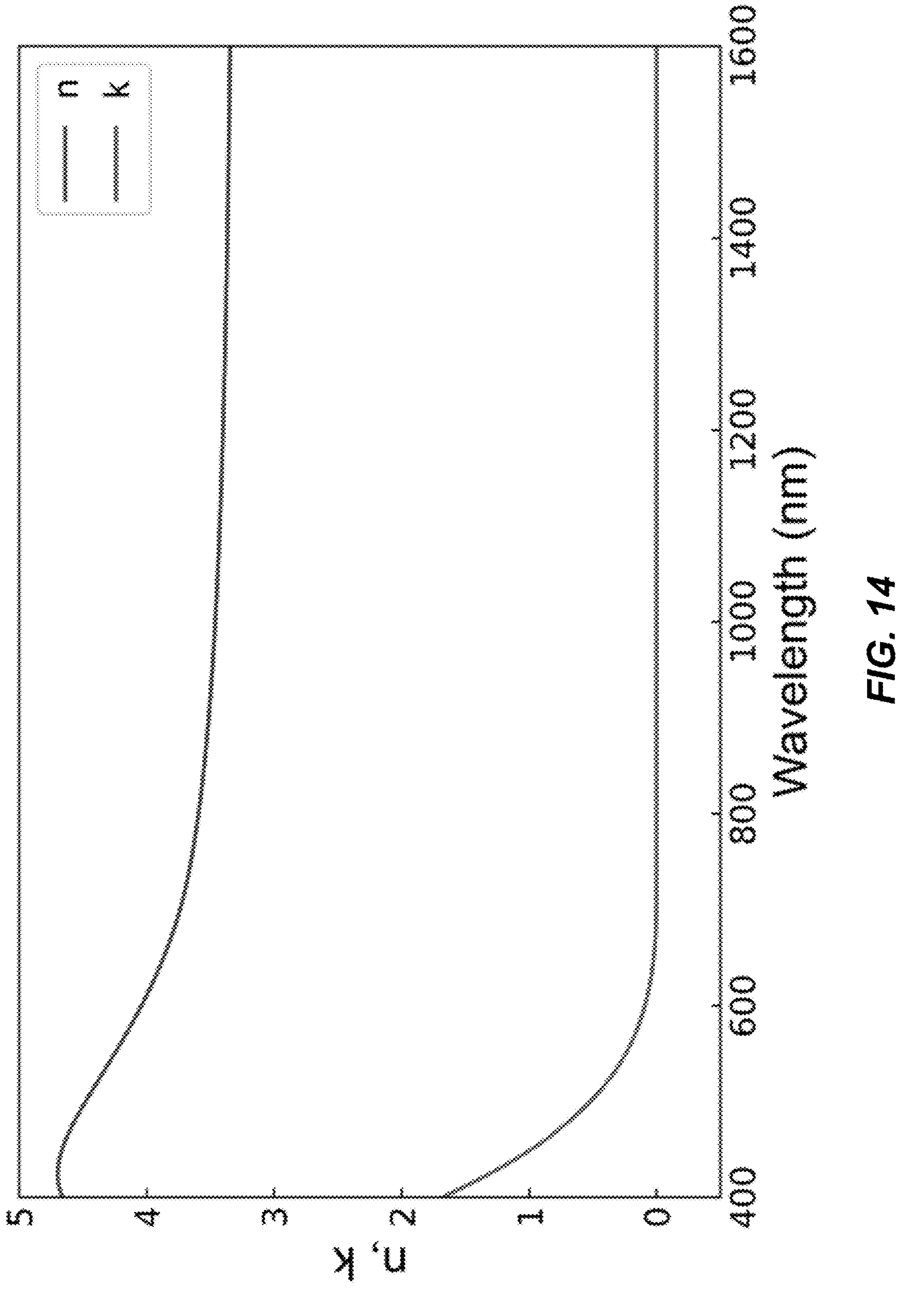
FIG. 14 is a chart illustrating ellipsometry measurement data for deposited amorphous silicon, according to some examples.

To simulate the optical field distribution, a full-field analysis was first conducted to calculate the background field, comprising the incident and reflected fields generated by the DBR layer. The scattered field was then determined based on the background field using the wave equation $\nabla\times\nabla\times E-k_0^2\varepsilon E=0$, where E represents the distributed electric field, $k_0$ represents the free-space wavenumber, and $\varepsilon$ represents the relative permittivity. Perfectly matched layers (PMLs) were applied as boundary conditions to minimize reflection artifacts. The optical properties of the silicon nanoantenna were defined using optical properties (n, $\kappa$) obtained from ellipsometry measurements, as shown in FIG. 14. FIG. 14 is a chart illustrating ellipsometry measurement data for the deposited amorphous silicon, according to some examples.

The spatial power dissipation density q(r) was calculated using the scattered field distribution and the equation $$q(r) = \frac{1}{2}\text{Re}(J \cdot E^*),$$

where J is the induced current and E is the distributed electric field. The Heat Transfer Module was employed to estimate the temperature rise in the system. The steady-state temperature increase was computed by solving the equation $\nabla\cdot[-\kappa\nabla T(r)+\rho c_p T(r)u(r)]=\iiint q(r)d^3r$, where $\kappa$, $\rho$, and $c_p$ are thermal conductivity, density, and heat capacity of material domains including water, silicon, and silicon dioxide. For the amorphous silicon, 1.8 W/(m·K), 2,329 kg/m$^3$, and 700 J/(kg·K) were used for κ, ρ, and $c_p$, respectively. The extinction coefficient of water was assigned as 0.000003436. The boundary temperature was set as 293.15 K with the size of the physical domain set as 80 μm in width, 80 μm in depth, and 120 μm in height.

When the laser power was set to 19 mW, with a spot size of approximately 1.33 μm in diameter, the maximum temperature rise was calculated to be about 0.75 K at a wavelength of 973 nm, as shown in Chart F of FIG. 11. This negligible temperature increase indicates that the excitation of the anapole state does not significantly contribute to Brownian motion, thermophoretic particle movement, or buoyancy-driven thermal convection. Instead, the enhanced near-field optical gradient force, enabled by the anapole resonance, is the primary mechanism driving the nanoscale optical trapping.

The optical force acting on a particle was calculated using the Maxwell Stress Tensor (MST) formalism. In this approach, the total force $\vec{F}$ s determined by integrating the Maxwell stress tensor $\overleftrightarrow{T}_{i\,ij}$ over a closed surface enclosing the particle according to the equation $\vec{F} = \oiint \overleftrightarrow{T}_{i\,ij} \cdot dA$. The Maxwell stress tensor $\overleftrightarrow{T}_{i\,ij}$ may be defined by the equation $$\overleftrightarrow{T}_{ij} = \varepsilon_0\left(\vec{E}_i\vec{E}_j - \frac{1}{2}\delta_{ij}\vec{E}^2\right) + \frac{1}{\mu_0}\left(\vec{B}_i\vec{B}_j - \frac{1}{2}\delta_{ij}\vec{B}^2\right).$$

The finite-difference time-domain (FDTD) method, implemented in the Lumerical software package, may be used to simulate the optical force exerted on the particle.

Figure 15:
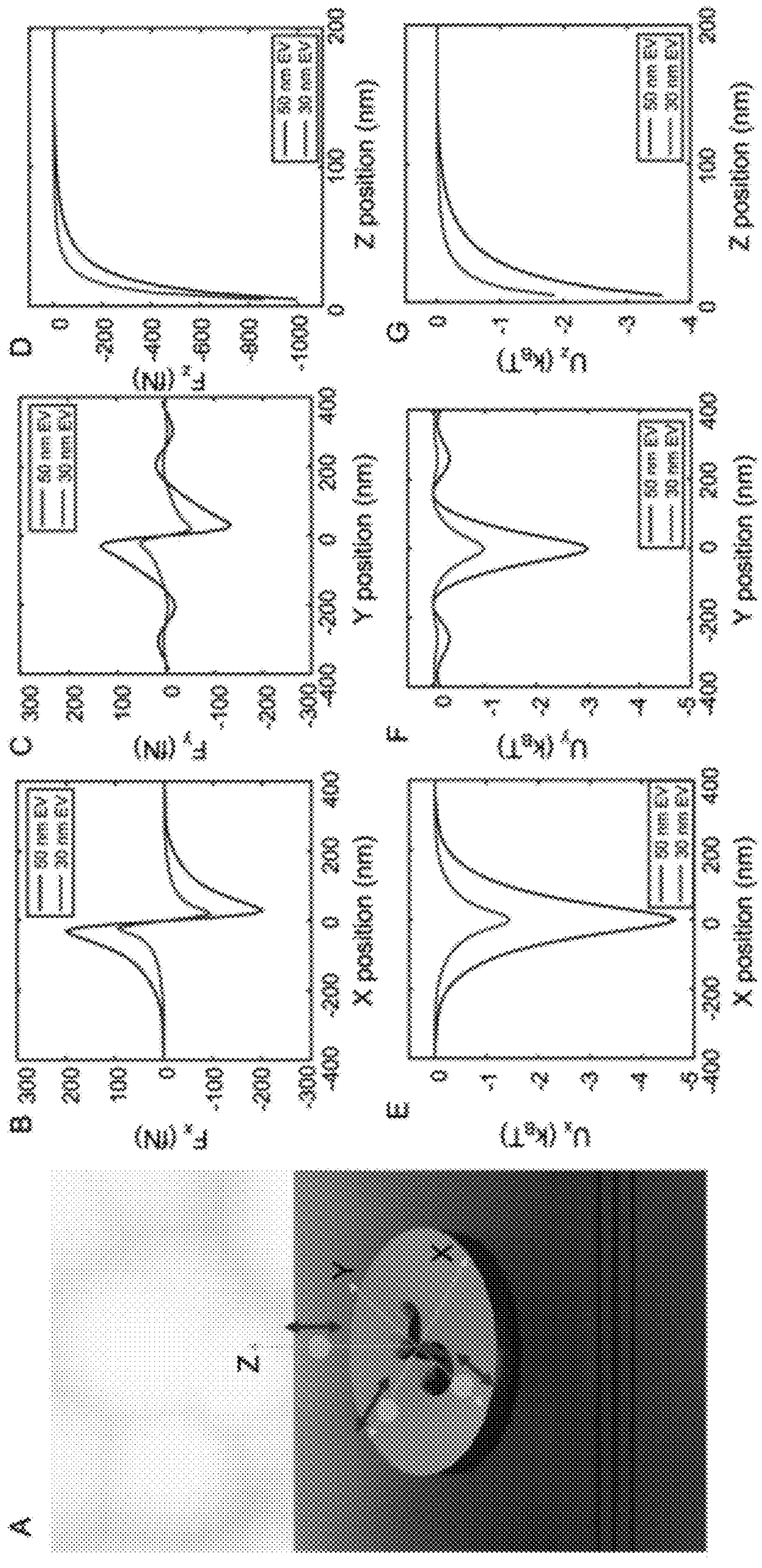
FIG. 15 illustrates the calculation of optical trapping forces and potential energies for extracellular vesicles, according to some examples.

FIG. 15 illustrates the calculation of optical trapping forces and potential energies for extracellular vesicles (EVs) with diameters of 50 nm and 30 nm, according to some examples. Diagram A of FIG. 15 depicts particle trajectories considered during the calculation of optical forces using the Maxwell Stress Tensor (MST) method along the x-, y-, and z-axes. The corresponding force components ($F_x$, $F_y$, $F_z$) and potential energies ($U_x$, $U_y$, $U_z$) are presented in Charts B-G of FIG. 15.

Numerical simulations were conducted to calculate the optical forces and trapping potentials along the x-, y-, and z-directions, assuming vesicle diameters of 50 nm and 30 nm. These sizes are within the lower range of small EVs as defined by the International Society of Extracellular Vesicles (ISEV), which categorizes small EVs as those with diameters less than 200 nm. Based on various studies, the refractive index of EVs is heterogeneous, ranging from 1.37 to 1.39; for these simulations, a refractive index of 1.39 was used. The laser power was set to 19 mW, and the spot size was assumed to be approximately 1.33 μm in diameter.

Chart B of FIG. 15 shows the calculated x-component of the optical force $F_x$ along the x-axis, where the EV is positioned along the x-direction. The simulations assume that the particle's lowest point is about 5 nm above the surface of the anapole disk. The calculated forces demonstrate that $F_x$ consistently directs the particle toward the slot center. Correspondingly, Chart E of FIG. 15 shows the trapping potential energy $U_x$ along the x-axis, revealing potentials of about 4.6 $k_BT$ and about 1.4 $k_BT$ for 50 nm and 30 nm EVs, respectively.

For the y-axis, Charts C and F of FIG. 15 present the optical force $F_y$ and the corresponding potential energy $U_y$. The results indicate that the maximum potential energy for the 50 nm EV is about 3.2 times higher than that of the 30 nm EV. However, the simulations predict slightly lower trapping stability along the y-axis compared to the x-axis, aligning with experimental observations described in subsequent sections.

Charts D and G of FIG. 15 depict the optical force $F_z$ and the trapping potential energy $U_z$ along the z-axis. The simulations swept the particle position from 5 nm above the anapole disk to 250 nm from the disk surface. The results show that both $F_z$ and $U_z$ decay as the particle moves away from the hotspot, becoming negligible when the z-distance exceeds 100 nm. This indicates that the trapped particle should remain in close proximity to the anapole disk surface for stable confinement.

Figure 16:
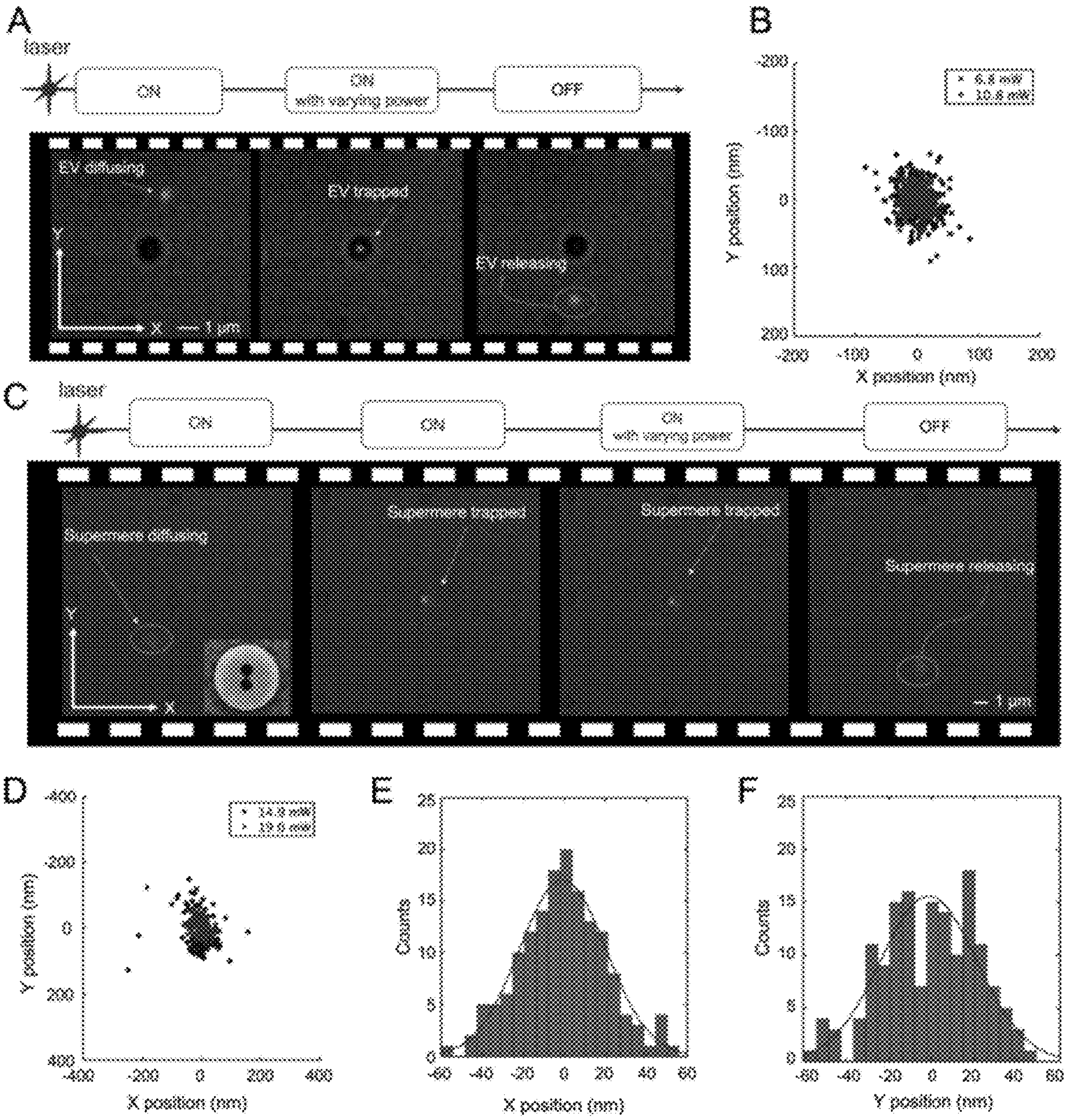
FIG. 16 presents a series of diagrams and charts illustrating extracellular vesicle and supermere trapping experiments conducted to demonstrate anapole-assisted optical trapping, according to some examples.

FIG. 16 presents a series of diagrams and charts illustrating extracellular vesicle (EV) and supermere trapping experiments conducted to demonstrate anapole-assisted optical trapping, according to some examples. Fluorescently labeled nanoscale EVs and supermere nanoparticle samples were used to validate the trapping capabilities of the described system. For particle tracking analysis, the open-source Python package Trackpy (Trackpy v0.5.0, soft-matter/trackpy) was utilized. The analysis involved converting recorded video data into image sequences, followed by applying the package's built-in algorithms to identify and track the fluorescence emitted by the trapped particles in each frame.

For sample preparation, human codon-optimized TGFBI (NM_000358.3) was synthesized by VectorBuilder (Chicago, IL) and included a 3×GGGS linker, a C-terminal neon green fluorescent tag, a 3×FLAG-tag, a TEV protease site, a HIS-tag, and a MYC-tag cassette within a pLV[Exp]-Puro-CB retroviral vector. Retrovirus derived from this construct was used to transduce colorectal cancer cell lines DiFi and CC-CR. Following puromycin selection, cells exhibiting high levels of neon green fluorescence were further enriched through flow cytometry sorting. Transfected cells were cultured in a hollow fiber bioreactor system (FiberCell, New Market, MD), in accordance with the manufacturer's instructions and the methods described by LePlante et al. (in press). Serum replacement media (CDM-HD) was used to support cell growth.

To isolate neon green-labeled TGFBI-containing DiFi supermeres, conditioned media (50 mL) from the bioreactor was first clarified by centrifugation at 250×g for 10 minutes, followed by a second spin at 1363× g for 10 minutes. The supernatant was then passed through a Millex 0.22 μm pore syringe filter (MilliporeSigma, Burlington, MA). Media was concentrated to 1 mL using a 10 kDa molecular weight cutoff (MWCO) centrifugal filter unit (Amicon, Millipore) and subjected to size-exclusion chromatography (SEC). The concentrated sample (1 mL) was injected into an ÄKTA Purifier fast-protein liquid chromatography (FPLC) system (Cytiva, Marlborough, MA) equipped with two in-line Superose 6 (30/100 GL) slurry columns. The system operated at a flow rate of 0.3 mL/min, and fractions were collected at 1.5 mL intervals.

The distribution of TGFBI-containing supermeres may be identified using a neon green, fluorescent tag and quantified by microplate fluorometry (BioTek, Agilent, Santa Clara, CA). Supermere fractions were pooled and concentrated using a centrifugal filter unit with a 10 kDa molecular weight cutoff (MWCO). Total protein levels may be determined using a bicinchoninic acid (BCA) assay kit (Pierce, Thermo Fisher, Waltham, MA).

To purify TGFBI-containing supermeres from the total protein fraction, His-tag binding nickel columns (MilliporeSigma) may be used. The samples may be loaded onto the nickel resin, where the His-tagged TGFBI-containing supermeres selectively bound to the column. Unbound impurities may be removed through extensive washing, and the bound supermeres may be eluted according to the manufacturer's instructions. To remove the His-tag, the purified supermeres may be treated with tobacco etch virus (TEV) protease at a 10:1 enzyme-to-protein ratio in the presence of 3 mM dithiothreitol (DTT). Following the cleavage reaction, the sample may be reapplied to the nickel column to remove the cleaved His-tags, and the flow-through containing the purified TGFBI-containing supermeres may be collected for downstream analysis.

Extracellular vesicle (EV) trapping experiments were conducted using lyophilized, fluorescently labeled exosomes obtained from Creative Diagnostics. To prepare the working solution, 100 μL of deionized (DI) water was added to 100 μg of exosome solids to create a 1 μg/μL stock solution with an estimated particle concentration of 1010 particles/mL, as specified by the manufacturer. This stock solution was diluted 100-fold with DI water, resulting in a final particle concentration of 108 particles/mL, which was used for experimental EV trapping demonstrations.

FIG. 16 illustrates experimental results showcasing the optical trapping of extracellular vesicles (EVs) and supermeres using the anapole nanoantenna. Diagram A of FIG. 16 depicts an EV trapping experiment, where a diffusing EV is captured on the anapole nanoantenna when illuminated with a 973 nm laser. The EV is released once the laser is turned off. Chart B of FIG. 16 presents a scatter plot of the EV's trajectory while it is trapped on the nanoantenna, with an estimated stiffness of 0.347 fN/nm along the x-axis and 0.329 fN/nm along the y-axis under an incident laser power of 10.8 mW.

Diagram C of FIG. 16 demonstrates a similar trapping experiment with supermeres, showing the trapping of a diffusing supermere near the anapole nanoantenna while the laser is active. Once the laser is switched off, the supermere diffuses away. Chart D of FIG. 16 shows a scatter plot of the supermere's trajectory during the trapping process. The estimated stiffness for the trapped supermere is 0.215 fN/nm along the x-axis and 0.205 fN/nm along the y-axis under an incident laser power of 19 mW. Charts E and F of FIG. 16 provide histograms of the trapped supermere particle's positional distribution along the x- and y-axes, respectively, under a 19 mW incident laser power. Gaussian fits to these distributions are overlaid to estimate the trap stiffness.

Diagram A of FIG. 16 illustrates a sequence of frames capturing the stages of extracellular vesicle (EV) trapping: diffusion, capture, and release. When the linearly polarized laser (wavelength: 973 nm) is focused on the anapole nanoantenna, the EV diffuses into the vicinity of the antenna and is subsequently captured by the near-field optical forces generated by the anapole mode. The anapole mode can be excited by focused light across a wide range of incident angles. Once the EV is trapped, the laser power is varied to investigate the trapping stability.

Chart B of FIG. 16 presents the scatter plot of the EV's position under two laser power levels (10.8 mW and 6.8 mW). The results indicate tighter confinement under higher laser power. At 10.8 mW, the EV is predominantly confined at the center of the trap, whereas at 6.8 mW, the confinement becomes looser. The extracted stiffness values along the x- and y-axes under 10.8 mW laser power are 0.347 fN/nm and 0.329 fN/nm, respectively, after correcting for motion blur.

Gaussian fitting is first performed to estimate the variances $\langle x^2 \rangle$ and $\langle y^2 \rangle$ from the extracted particle displacements, and the stiffness in the x-direction K, is calculated using $$\frac{1}{2}k_B T = \frac{1}{2}\kappa_x \langle x^2 \rangle.$$

To take into account the effect of motion blur, a correction function given by the equation $$\mathrm{var}(X_m) = \frac{2k_B T}{k}\left(\frac{\tau}{W} - \frac{\tau^2}{W^2}\left(1 - e^{-W/\tau}\right)\right)$$

is employed, where $$\tau = \frac{k_B T}{Dk},\ \mathrm{var}(X_m)$$

is the measured variance, W is the applied exposure time, t is the trap relaxation time, D is the Brownian diffusion coefficient, and k is the calibrated stiffness. After applying motion blur correction, the stiffness values $k_x$ and $k_y$ for supermere trapping under 19 mW laser power are 0.215 fN/nm and 0.205 fN/nm, respectively. Stiffness values $k_x$ and $k_y$ for the trapped EV under 10.8 mW are 0.347 fN/nm and 0.329 fN/nm, respectively.

Experiments were conducted to trap fluorescently labeled supermere samples using the anapole nanoantenna, as shown in Diagram C of FIG. 16. The experimental setup and trapping procedures were the same as those used for extracellular vesicles (EVs). Trapping stability was analyzed as a function of laser power. Chart D of FIG. 16 shows a scatter plot of a trapped supermere's positional distribution within the anapole trap. Positional data along the x- and y-axes are presented as histograms in Charts E and F of FIG. 16, respectively. Gaussian fitting was applied to these distributions to extract positional variances, and a motion blur correction was applied. Stiffness values were calculated based on the full width at half maximum (FWHM) of the Gaussian fits. Under a laser power of 19 mW, the stiffness values were 0.215 fN/nm along the x-axis and 0.205 fN/nm along the y-axis.

Figure 17:
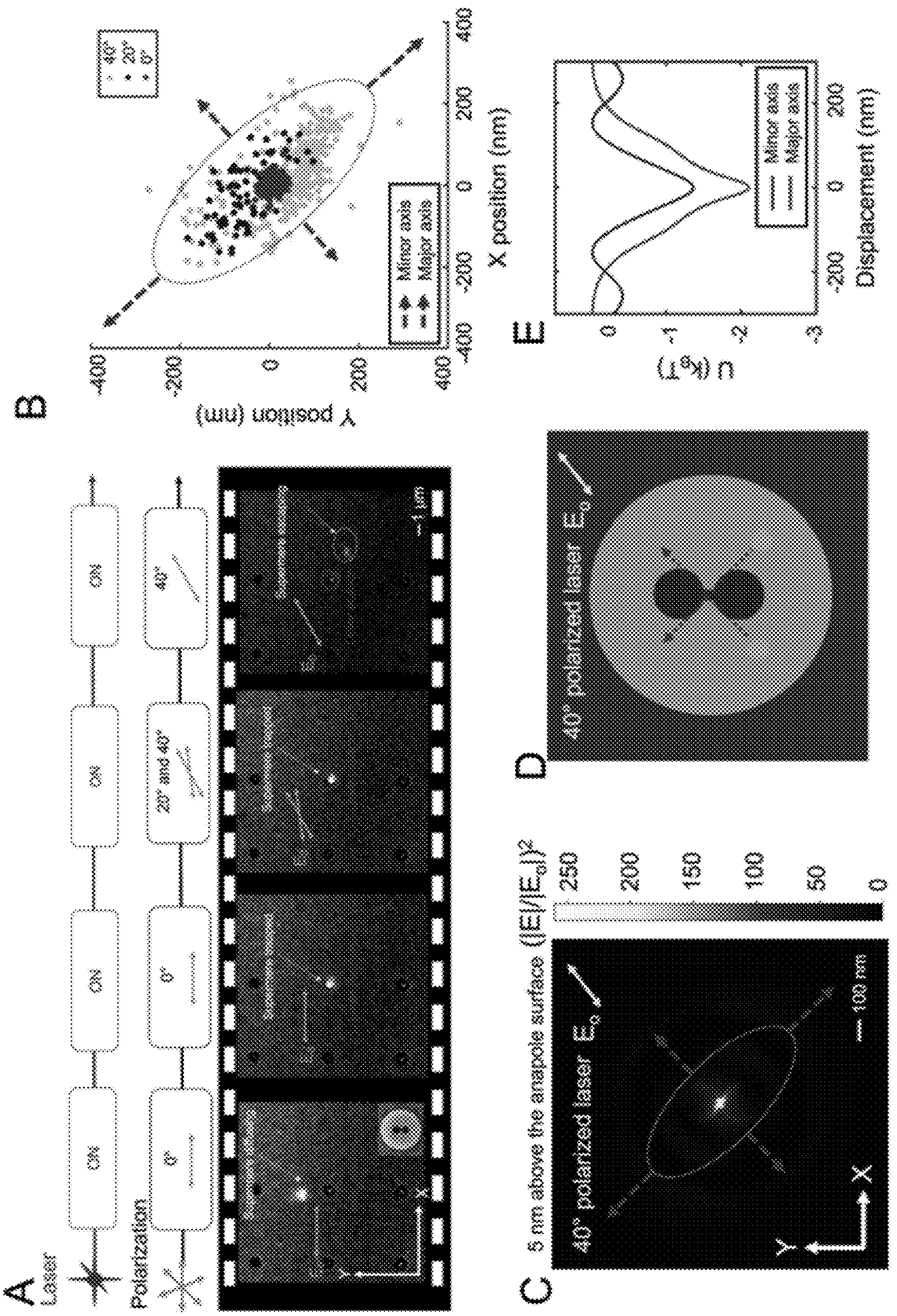
FIG. 17 presents a series of diagrams and charts illustrating supermere trapping experiments under varying laser polarization, according to some examples.

To assess the role of the anapole resonator's near-field effect in supermere trapping, experiments were performed with varying laser polarization angles. The polarization angle was defined relative to the x-axis, with 0° corresponding to the orientation providing optimal trapping conditions. A decrease in trapping stability was expected at other polarization angles. Polarization was adjusted to 20° and 40° relative to the x-axis, as shown in FIG. 17, to test this prediction. Results showed reduced trapping stability at non-optimal polarization angles, supporting the conclusion that the near-field effect of the anapole resonator contributes to supermere trapping.

FIG. 17 presents a series of diagrams and charts illustrating supermere trapping experiments under varying laser polarization, according to some examples. Diagram A of FIG. 17 depicts the trapping of a diffusing supermere using the anapole nanoantenna, followed by a change in the laser polarization angle from 0° to 40°. Chart B of FIG. 17 shows a scatter plot of the supermere's trajectory as the laser polarization is varied. Diagram C of FIG. 17 illustrates the intensity enhancement distribution when the laser polarization is set to 40° relative to the x-axis, revealing a larger gradient along the direction represented as the minor axis compared to the major axis, as shown in the figure. Diagram D of FIG. 17 provides an x-y plane schematic depicting the particle's position for Maxwell Stress Tensor (MST) calculations. This diagram includes indications of the major and minor axes (indicated by arrows) and the location of the bioparticle (represented by two circles). Chart E of FIG. 17 shows the calculated optical potential depths along the major and minor axes, highlighting differences in trapping potential.

Diagram A of FIG. 17 illustrates the reduction in trapping stability as the polarization angle deviated from 0°, confirming that near-field trapping is facilitated by the anapole state. At a polarization angle of 40°, the trapped particle exhibited looser confinement, with its displacement forming an elliptical distribution. This distribution can be represented by a major and minor axis, as shown by the dotted arrows in Diagram B of FIG. 17. Numerical calculations were performed to clarify this observation. The results indicated that as the laser's polarization angle shifted away from 0°, the electric field enhancement within the double-nanohole (DNH) structure decreased. This reduction in electric field enhancement weakened the trapping forces acting on the particle, leading to a broader trajectory. The intensity distribution measured 5 nm above the structure, shown in Diagram C of FIG. 17, displayed a distorted field pattern with an intensity enhancement of approximately 260 times.

Based on the observations and numerical calculations, the calculated trapping potentials along the minor and major axes are plotted in Chart E of FIG. 17, as indicated by the arrows in Diagrams C and D of FIG. 17. These results demonstrate that the trapping potential along the major axis is lower than that along the minor axis, consistent with the elliptical distribution observed in Diagram B of FIG. 17. This difference in potential depths confirms the role of the enhanced near field generated by the anapole nanoantenna in enabling stable trapping of nanoscale particles such as supermeres and extracellular vesicles (EVs). Notably, the stable trapping observed in these experiments arises from the localized electromagnetic field enhancement provided by the anapole antenna, rather than from the incident laser light.

Figure 18:
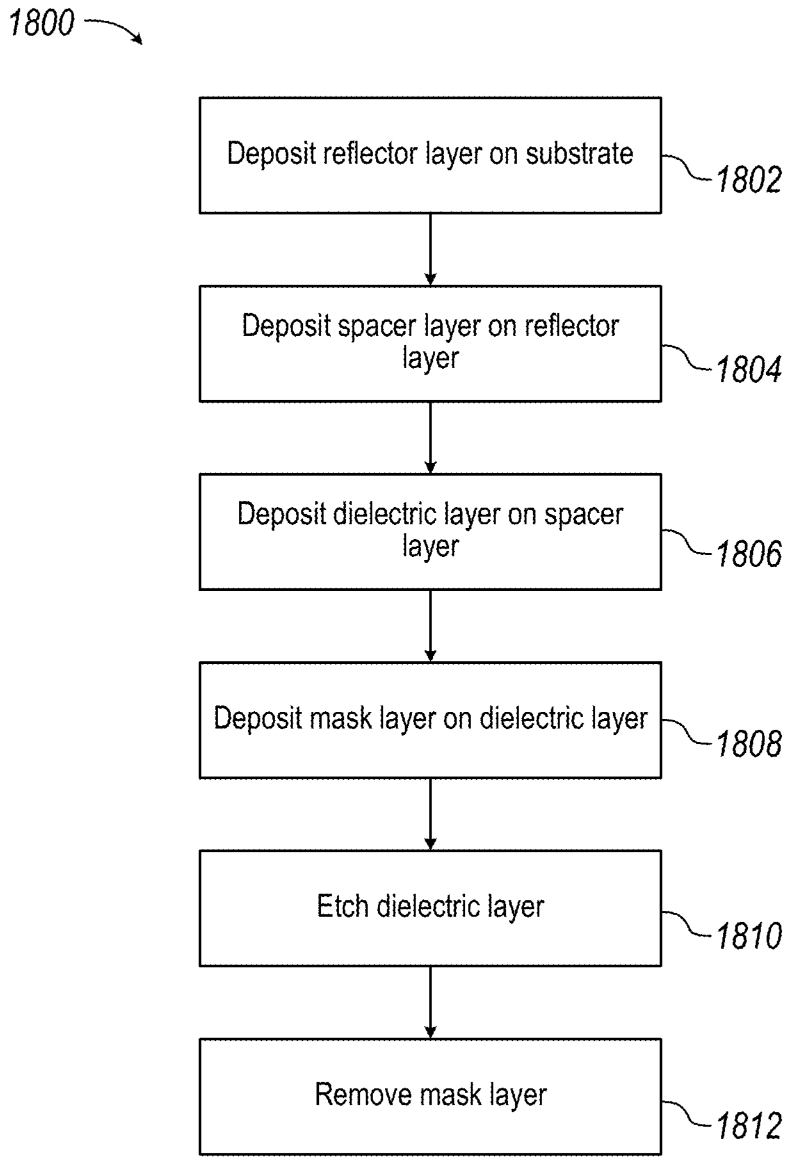
FIG. 18 is a flowchart illustrating a process for manufacturing a nanotweezer device, according to some examples.
Figure 19:
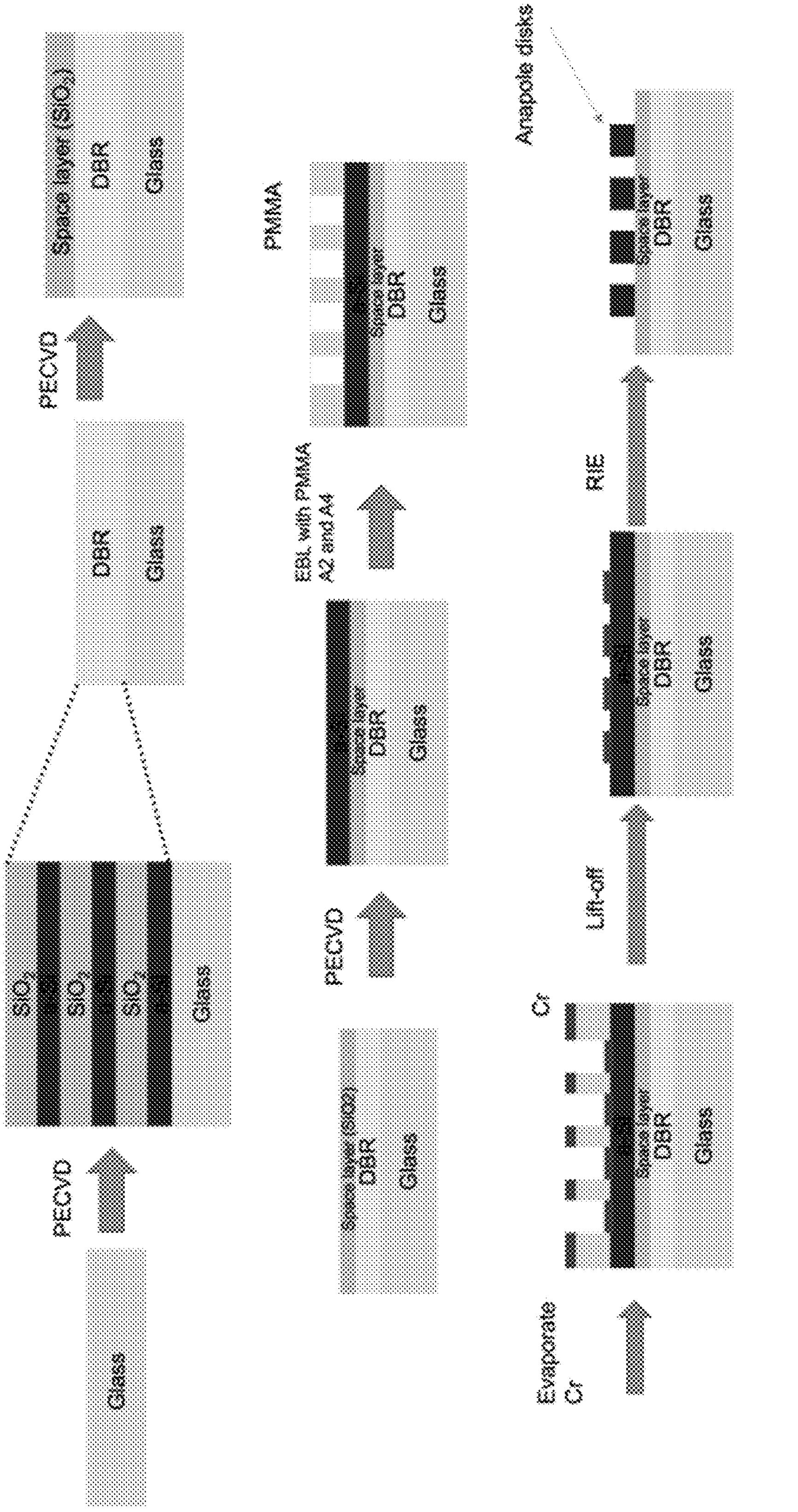
FIG. 19 is a diagram illustrating cross-sectional views of a nanotweezer device as the nanotweezer device 104 undergoes a manufacturing process, according to some examples.

FIG. 18 is a flowchart illustrating a process 1800 for manufacturing the nanotweezer device 104, according to some examples. FIG. 19 is diagram illustrating cross-sectional views of the nanotweezer device 104 as the nanotweezer device 104 undergoes the manufacturing process 1800, according to some examples. Referring collectively to FIGS. 18 and 19, in the example process 1800, alternating layers of amorphous silicon (for example, 71 nm in thickness) and silicon dioxide (for example, 168 nm in thickness) may be deposited on a glass substrate as first dielectric layers 406 and second dielectric layers 408, respectively (at block 1802). In various implementations, to increase reflectivity at a 973 nm wavelength, a paired stack of amorphous silicon and silicon dioxide may be repeated three times to collectively form a reflective layer (for example, a distributed Bragg reflector). In the example process 1800, a 250 nm silicon dioxide layer may be deposited on the reflector layer as a spacer layer (at block 1804). In the example process 1800, a dielectric layer such as an amorphous silicon layer having a thickness corresponding to the thickness of the anapole nanoantenna 202 (for example, 130 nm) is deposited on the spacer layer (at block 1806). In the example process 1800, a mask layer is deposited on the dielectric layer (at block 1808). The mask layer may have the pattern of the anapole nanoantenna 202. For example, the mask layer may be deposited in a pattern corresponding to the dielectric disk 204 and may be absent at the nanohole 208. Double-layer PMMA lithography may be adapted to ensure realization of the nanoscale gap of the double nanohole (DNH) apertures. Specifically, PMMA 950K A2 may be first spin coated, followed by a layer of PMMA 950K A4 with the same spin coating recipe. Electron beam lithography (e.g., Raith eLiNE) may be used to write the pattern. After EBL, Cr hard mask was thermally evaporated, and lift-off was conducted in NMP165 remover. In the example process 1800, the dielectric layer is etched to form the dielectric disk 204 (including the nanohole 208) (at block 1810). For example, the final shape of the dielectric disk 204 may be obtained by reactive ion etching (e.g., Oxford PlasmaPro 100 Cobra). In the example process 1800, the mask layer (e.g., the Cr hard mask) may be removed (at block 1812), leaving the nanotweezer device 104.

FIG. 18 is a flowchart illustrating a process 1800 for manufacturing the nanotweezer device 104, according to some examples. FIG. 19 is a diagram illustrating cross-sectional views of the nanotweezer device 104 as the nanotweezer device 104 undergoes the manufacturing process 1800, according to some examples. Referring collectively to FIGS. 18 and 19, in the example process 1800, a reflector layer is deposited on a substrate (at block 1802). The reflector layer is implemented as a distributed Bragg reflector (DBR) and consists of alternating layers of amorphous silicon (first dielectric layer 406) and silicon dioxide (second dielectric layer 408). The substrate may be the previously described quartz substrate 502. In some examples, the first dielectric layer 406 may have a thickness of approximately 71 nm, while the second dielectric layer 408 may have a thickness of approximately 168 nm. These alternating layers may be deposited on a glass substrate and may be repeated three times to enhance reflectivity at a target wavelength of 973 nm, forming part of the nanotweezer device 104.

In the example process 1800, a spacer layer 404 is deposited on the reflector layer (at block 1804). The spacer layer 404, which may be composed of silicon dioxide, may have a thickness of about 250 nm. The spacer layer 404 optimizes the optical interaction between the reflector layer and the anapole nanoantenna 202 by positioning the nanoantenna at the peak of the standing wave created by the incident laser light. This design helps ensure maximum electric field enhancement for effective optical trapping.

In the example process 1800, a dielectric layer is deposited on the spacer layer 404 (at block 1806). The dielectric layer, composed of amorphous silicon, has a thickness corresponding to the dielectric disk 204 of the anapole nanoantenna, for example, about 130 nm. This layer forms the structural material for the dielectric disk 204. In the example process 1800, a mask layer is deposited on the dielectric layer (at block 1808). The mask layer defines the pattern of the dielectric disk 204 and the nanohole 208. Double-layer PMMA lithography may be employed to achieve the nanoscale precision required for the double-nanohole (DNH) apertures. For instance, PMMA 950K A2 is first spin-coated, followed by a layer of PMMA 950K A4. The desired pattern may then be written using electron beam lithography (e.g., Raith eLiNE). A chromium (Cr) hard mask may be thermally evaporated over the pattern, and lift-off is performed using NMP165 remover to ensure accurate transfer of the design.

In the example process 1800, the dielectric layer is etched (at block 1810). Reactive ion etching (RIE), such as with an Oxford PlasmaPro 100 Cobra system, is used to remove material selectively and create the final shape of the dielectric disk 204 and nanohole 208. This step ensures precise fabrication of the anapole nanoantenna geometry as part of the nanotweezer device 104. In the example process 1800, the mask layer is removed (at block 1812). For example, the Cr hard mask is removed using a wet etching process, leaving the completed nanotweezer device 104, including the dielectric disk 204, nanohole 208, spacer layer 404, first dielectric layers 406, and second dielectric layers 408.

As previously described, the systems, apparatuses, methods, and techniques presented here address longstanding challenges in nanoscale optical trapping. For example, techniques described here demonstrate, for the first time, the ability to trap nanoscale extracellular vesicles (EVs) and recently identified supermeres using the nanoscale-confined light fields generated by optical anapole states. The anapole-assisted optical trapping system achieves stable trapping of supermeres with input power reduced by two orders of magnitude compared to conventional optical tweezers. By incorporating a distributed Bragg reflector (DBR) to control the reflection phase of incident light, the system optimizes field enhancement within the anapole structure without relying on metallic films. This all-dielectric design eliminates loss-induced heating, a significant limitation of metallic structures, thereby preserving the structural and functional integrity of trapped biological particles.

The low-loss nature of the proposed system precludes significant local temperature rises, ensuring that sensitive biomolecules and nanoscale particles remain intact during trapping experiments. This capability allows researchers to avoid undesirable thermohydrodynamic effects, such as convection or thermophoresis, that could compromise trapping stability. The result is a highly efficient and stable optical trapping system that operates at low power, enabling precise manipulation of nanoscale EVs, supermeres, and other nano-sized extracellular vesicular particles (EVPs).

Beyond its implications for optical trapping, the anapole-enabled system demonstrates the versatility of all-dielectric approaches for enhancing electromagnetic fields. Such techniques hold promise for applications in diverse fields, including low-threshold lasing, nonlinear optical processes, and enhanced light-matter interactions where high field intensity and low optical losses are critical. The ability to precisely tailor the anapole nanoantenna and surrounding layers provides a powerful platform for exploring and exploiting nanoscale phenomena.

In conclusion, systems, methods, apparatuses, and techniques described herein highlight the potential of anapole-assisted optical trapping as a transformative tool for trapping and analyzing nanoscale biological particles. This approach offers significant technical advantages over traditional optical tweezers, including reduced power requirements, enhanced trapping stability, and minimized photothermal effects. By addressing these challenges, the proposed system opens new avenues for investigating the properties and functions of nanoscale biological entities, paving the way for advances in biophysics, nanotechnology, and related disciplines. This innovative technology represents a promising foundation for a wide range of future applications in the study and manipulation of nanoscale systems.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

Additionally, operations (such as processes, decisions, inputs, outputs, actions, messages, interactions, events, and/or any other operations) shown in the flowcharts and/or message sequence charts may be illustrated once each and in a particular order in the drawings. However, in various implementations, the operations may be reordered and/or repeated as may be suitable. In some examples, different operations may be performed in parallel, as may be appropriate.

The term computer-readable medium does not encompass transitory electrical or electromagnetic signals or electromagnetic signals propagating through a medium-such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

What is claimed is:

1. A nanotweezer comprising:

an anapole nanoantenna having a double nanohole formed through a central region of the anapole nanoantenna;

a spacer layer positioned between the anapole nanoantenna and a reflector layer; and a light source configured to illuminate the reflector layer;

wherein upon illumination of the reflector layer by the light source, an optical gradient force is generated at the double nanohole.

2. The nanotweezer of claim 1, wherein the reflector layer includes a first dielectric layer and a second dielectric layer.

3. The nanotweezer of claim 2, wherein the first dielectric layer and the second dielectric layer have contrasting refractive indices.

4. The nanotweezer of claim 1, wherein the reflector layer includes:

a plurality of alternating dielectric layers having contrasting refractive indices; and a metal layer, the metal layer including gold.

5. The nanotweezer of claim 1, wherein the anapole nanoantenna includes a silicon material.

6. The nanotweezer of claim 1, wherein the spacer layer includes a silicon dioxide material.

7. The nanotweezer of claim 2, wherein the first dielectric layer includes a silicon dioxide material.

8. The nanotweezer of claim 2, wherein the second dielectric layer includes a silicon material.

9. The nanotweezer of claim 2, wherein the light source is configured to emit a laser having a wavelength in a range of between about 800 nanometers to about 1,200 nanometers.

10. The nanotweezer of claim 9, wherein:

the anapole nanoantenna has a thickness of about 130 nanometers;

the double nanohole is a double-nanohole slot include two substantially circular holes connected by a slot-shaped opening having a width of about 30 nm;

the spacer layer has a thickness of about 250 nanometers;

the first dielectric layer has a thickness of about 168 nanometers; and the second dielectric layer has a thickness of about 71 nanometers.

11. A method for generating an optical gradient force at a nanotweezer, the method comprising:

illuminating the nanotweezer with a light source;

wherein the nanotweezer includes:

an anapole nanoantenna having a double nanohole formed through a central region of the anapole nanoantenna, and a spacer layer positioned between the anapole nanoantenna and a reflector layer.

12. The method of claim 11, wherein the reflector layer includes a first dielectric layer and a second dielectric layer.

13. The method of claim 12, wherein the first dielectric layer and the second dielectric layer have contrasting refractive indices.

14. The method of claim 11, wherein the reflector layer includes:

a plurality of alternating dielectric layers having contrasting refractive indices; and a metal layer, the metal layer including gold.

15. The method of claim 11, wherein the anapole nanoantenna includes a silicon material.

16. The method of claim 11, wherein the spacer layer includes a silicon dioxide material.

17. The method of claim 12, wherein the first dielectric layer includes a silicon dioxide material.

18. The method of claim 12, wherein the second dielectric layer includes a silicon material.

19. The method of claim 12, wherein the light source is configured to emit a laser having a wavelength in a range of between about 800 nanometers to about 1,200 nanometers.

20. The method of claim 19, wherein:

the anapole nanoantenna has a thickness of about 130 nanometers;

the double nanohole is a double-nanohole slot include two substantially circular holes connected by a slot-shaped opening having a width of about 30 nm;

the spacer layer has a thickness of about 250 nanometers;

the first dielectric layer has a thickness of about 168 nanometers; and the second dielectric layer has a thickness of about 71 nanometers.

* * * * *